United States Patent
Tanimura et al.

(10) Patent No.: US 10,804,544 B2
(45) Date of Patent: Oct. 13, 2020

(54) GAS DIFFUSION ELECTRODE SUBSTRATE, AND MEMBRANE ELECTRODE ASSEMBLY AND FUEL CELL EQUIPPED WITH SAME

(71) Applicant: TORAY INDUSTRIES, INC., Tokyo (JP)

(72) Inventors: Yasuaki Tanimura, Otsu (JP); Masamichi Utsunomiya, Otsu (JP); Toshiya Kamae, Otsu (JP); Yasutaka Okano, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 472 days.

(21) Appl. No.: 15/119,163

(22) PCT Filed: Feb. 17, 2015

(86) PCT No.: PCT/JP2015/054195
§ 371 (c)(1),
(2) Date: Aug. 16, 2016

(87) PCT Pub. No.: WO2015/125749
PCT Pub. Date: Aug. 27, 2015

(65) Prior Publication Data
US 2017/0012297 A1 Jan. 12, 2017

(30) Foreign Application Priority Data
Feb. 24, 2014 (JP) ................. 2014-032829

(51) Int. Cl.
*H01M 8/0245* (2016.01)
*H01M 8/0234* (2016.01)
*H01M 8/0239* (2016.01)
*H01M 8/1004* (2016.01)
H01M 8/1018 (2016.01)
H01M 8/0243 (2016.01)

(52) U.S. Cl.
CPC ....... *H01M 8/0245* (2013.01); *H01M 8/0234* (2013.01); *H01M 8/0239* (2013.01); *H01M 8/1004* (2013.01); *H01M 8/0243* (2013.01); *H01M 2008/1095* (2013.01); *Y02E 60/50* (2013.01)

(58) Field of Classification Search
CPC ...... H01M 8/241; H01M 8/243; H01M 8/245; H01M 8/0245; H01M 8/0234; H01M 8/0239; H01M 2008/1095; Y02E 60/50
See application file for complete search history.

(56) References Cited

U.S. PATENT DOCUMENTS

2012/0156587 A1   6/2012   Akasaka et al.

FOREIGN PATENT DOCUMENTS

| JP | 2004-124267 A | 4/2004 |
|---|---|---|
| JP | 2005-267902 A | 9/2005 |
| JP | 2007-317435 A | 12/2007 |
| JP | 2008-311181 A | 12/2008 |
| JP | 2011-233274 A | 11/2011 |
| JP | 2012-054111 A | 3/2012 |
| WO | WO 2011/010339 A1 | 1/2011 |

OTHER PUBLICATIONS

El-Kharouf, Ahmad, et al. "Ex-situ characterisation of gas diffusion layers for proton exchange membrane fuel cells." Journal of Power Sources 218 (2012): 393-404. (Year: 2012).*
Kong, Chang Sun, et al. "Influence of pore-size distribution of diffusion layer on mass-transport problems of proton exchange membrane fuel cells." Journal of Power Sources108.1-2 (2002): 185-191. (Year: 2002).*
International Search Report (PCT/ISA/210) issued in PCT/JP2015/054195, dated May 19, 2015.
Written Opinion (PCT/ISA/237) issued in PCT/JP2015/054195, dated May 19, 2015.

* cited by examiner

*Primary Examiner* — Milton I Cano
*Assistant Examiner* — Philip A. Stuckey
(74) *Attorney, Agent, or Firm* — Birch, Stewart, Kolasch & Birch LLP

(57) ABSTRACT

A gas diffusion electrode substrate that is used in a fuel cell and is constituted by an electrode substrate and microporous parts, in which a microporous part (A) is formed on one surface of the electrode substrate with a thickness in the range of 10 μm or more and 60 μm or less, and in the gas diffusion electrode substrate, the pore volume of pores with a pore size of 0.1 μm or more and less than 10 μm is within the range of 0.9 times or more and 5 times or less of the pore volume of pores with a pore size of 10 μm or more and less than 100 μm.

16 Claims, No Drawings

GAS DIFFUSION ELECTRODE SUBSTRATE, AND MEMBRANE ELECTRODE ASSEMBLY AND FUEL CELL EQUIPPED WITH SAME

TECHNICAL FIELD

The present invention relates to a gas diffusion electrode substrate which is suitably used for a fuel cell, particularly for a polymer electrolyte fuel cell. More specifically, the present invention relates to a gas diffusion electrode substrate which is capable of exhibiting high fuel cell performance across a wide temperature range from low to high temperatures while maintaining mechanical properties, electrical conductivity and thermal conductivity, since gas diffusivity and water removal performance are good even in the conditions of low temperature and high humidity while having anti-dry-out characteristic at high temperatures.

BACKGROUND ART

A polymer electrolyte fuel cell in which a hydrogen-containing fuel gas and oxygen-containing oxidizing gas are supplied to an anode and cathode, respectively, and an electromotive force is generated by an electrochemical reaction occurring at both poles is generally constituted by sequentially laminating a bipolar plate, a gas diffusion electrode substrate, a catalyst layer, an electrolyte membrane, a catalyst layer, a gas diffusion electrode substrate, and a bipolar plate. The gas diffusion electrode substrate is required to have high gas diffusivity for allowing a gas supplied from the bipolar plate to be diffused into the catalyst layer and high water removal performance for discharging liquid water generated by the electrochemical reaction to the bipolar plate, as well as high electrical conductivity for extracting generated electric current, and gas diffusion electrode substrates composed of carbon fibers and the like are widely used.

However, the following problems are known: (1) when the polymer electrolyte fuel cell is operated at a relatively low temperature of below 70° C. in a high current density region, as a result of blockage of the electrode substrate by liquid water generated in a large amount and shortage in the fuel gas supply, the fuel cell performance is impaired (this problem is hereinafter referred to as "flooding"); and (2) when the polymer electrolyte fuel cell is operated at a relatively high temperature of 80° C. or more, as a result of drying of the electrolyte membrane due to water vapor diffusion and a reduction in the protonic conductivity, the fuel cell performance is deteriorated (this problem is hereinafter referred to as "dry-out"), and in order to solve these problems of (1) to (2), various efforts have been made. As the basic solution of these problems, a method of improving gas diffusivity and water removal performance by forming a microporous part on the surface of the gas diffusion electrode substrate, and forming pores in the microporous part.

Patent Document 1 discloses that a carbon porous material, i.e., a microporous part, is impregnated in an electrode substrate to set the density of the impregnated layer to a predetermined range, whereby stable fuel cell performance can be obtained in a low humidity condition and high humidity condition. However, by the structure in which a microporous part is impregnated in an electrode substrate, obtained by the above method, high gas diffusivity and high water removal performance cannot be simultaneously satisfied, and particularly, fuel cell performance has been insufficient at low temperatures.

Also, Patent Document 2 discloses a technology to obtain high performance by forming a through hole by putting a large quantity of pore-forming particles into the inside of the microporous layer, in each of the drying conditions and humidified conditions by separating the passages of water and gas. However, in the method disclosed in Patent Document 2, there was a problem that water discharged in the microporous layer accumulated in a carbon paper and inhibited diffusion of gas, and sufficient properties could not be obtained.

As described above, a variety of efforts have been made; however, one that can be satisfied as a gas diffusion electrode substrate which has excellent anti-flooding characteristic particularly at low temperatures without deteriorating anti-dry-out performance is yet to be discovered.

PRIOR ART DOCUMENTS

Patent Documents

Patent Document 1: Japanese Patent Laid-open Publication No. 2009-129599
Patent Document 2: Japanese Patent Laid-open Publication No. 2009-238376

SUMMARY OF THE INVENTION

Problems to be Solved by the Invention

An object of the present invention is to provide a gas diffusion electrode substrate which has high anti-flooding characteristic since gas diffusivity and water removal performance are excellent even in the conditions of low temperature and high humidity, while having anti-dry-out characteristic at high temperatures, and is capable of exhibiting high fuel cell performance across a wide temperature range from low to high temperatures without greatly impairing mechanical properties, electrical conductivity, and thermal conductivity.

Solutions to the Problems

In order to solve the above problems, the gas diffusion electrode substrate of the present invention adopts the following means. That is, the gas diffusion electrode substrate of the present invention is a gas diffusion electrode substrate that is used in a fuel cell and is constituted by an electrode substrate and microporous parts, in which a microporous part (A) is formed on one surface of the electrode substrate with a thickness in the range of 10 μm or more and 60 μm or less, and in the gas diffusion electrode substrate, the pore volume of pores with a pore size of 0.1 μm or more and less than 10 μm is within the range of 0.9 times or more and 5 times or less of the pore volume of pores with a pore size of 10 μm or more and less than 100 μm.

In order to solve the above problems, the membrane electrode assembly of the present invention adopts the following means. That is, the membrane electrode assembly of the present invention is a membrane electrode assembly having catalyst layers on both sides of the electrolyte membrane, and further having the gas diffusion electrode substrate on the outer side of the catalyst layers.

In order to solve the above problems, the fuel cell of the present invention adopts the following means. That is, the fuel cell of the present invention is a fuel cell having bipolar plates on both sides of the membrane electrode assembly.

Effects of the Invention

According to the present invention, discharge of liquid water in the gas diffusion electrode substrate is promoted, whereby gas diffusivity and water removal performance are excellent even in the conditions of low temperatures and high humidity, thus a gas diffusion electrode substrate having high anti-flooding characteristic can be obtained. Therefore, when the gas diffusion electrode substrate of the present invention is used in a fuel cell, it is possible to exhibit high fuel cell performance across a wide temperature range from low to high temperatures. Also, the gas diffusion electrode substrate of the present invention also has good mechanical strength, electrical conductivity, and thermal conductivity.

MODE FOR CARRYING OUT THE INVENTION

By a conventional method, both gas diffusivity and water removal performance in the through-plane direction of the electrode substrate could not be satisfied, thus performance could not be improved. This is because the pore in the inside of the electrode substrate was blocked by the microporous part to deteriorate liquid water removal, and in contrast, the large pore in the inside of the electrode substrate was blocked by a large amount of liquid water to deteriorate gas diffusion. However, the present inventors have found that, in the gas diffusion electrode substrate, not only the microporous part, but compatibility of gas diffusivity and water removal performance in the pore formed by the electrode substrate is rather important for fuel cell performance, and discovered that both gas diffusivity and water removal performance can be more effectively satisfied by controlling the pore size distribution as a whole gas diffusion electrode substrate, in the state that the microporous part is impregnated in at least a part of the electrode substrate. More specifically, pores with a pore size distributed in the range of 10 μm or more and less than 100 μm give a large gas diffusion effect, and become a passage of liquid water, but when a large amount of liquid water is generated, the pores become a hindrance of gas diffusion since liquid water stays in the pores. Meanwhile, pores with a pore size distributed in the range of 0.1 μm or more and less than 10 μm do not have large gas diffusion effect, but have an effect of suppressing staying of liquid water in the inside thereof, whereby gas diffusion can be secured even when a large amount of liquid water is generated. Paying attention to those features, the present inventors have found that pores with a pore size distributed in the range of 0.1 μm or more and less than 10 μm are increased while appropriately maintaining the volume of the pores with a pore size distributed in the range of 10 μm or more and less than 100 μm, thereby improving water removal performance, thus achieving the present invention in which both gas diffusivity and water removal performance can be satisfied.

It is necessary that the gas diffusion electrode substrate of the present invention is constituted by an electrode substrate and microporous parts, and a microporous part (A) is formed on one surface of the electrode substrate. The microporous part (A) is a microporous part laminated in a layer state on the surface of the electrode substrate, and is distinguished from the microporous part (B) described below that is a microporous part impregnated in at least a part of pores of the electrode substrate.

It is noted herein that, in the present invention, a substrate consisting of only a carbon paper or the like without any microporous part being formed thereon, or a portion thereof in the "gas diffusion electrode substrate" is referred to as "electrode substrate", and a substrate on which a microporous part is formed is referred to as "gas diffusion electrode substrate".

Each element will be described below.

The electrode substrate in the present invention is required to have high gas diffusivity for allowing a gas supplied from the bipolar plate to be diffused into the catalyst layer and high water removal performance for discharging liquid water generated by the electrochemical reaction to the bipolar plate, as well as high electrical conductivity for extracting generated electric current.

Therefore, as the electrode substrate, an electrically conductive porous material, specifically, a porous material such as carbon fiber woven fabric, carbon fiber non-woven fabric or carbon fiber papermaking substrate, or a metal porous material such as sinter foamed metal, metal mesh or expanded metal is used. Among them, a carbon fiber-containing porous material is preferably used because of its excellent corrosion resistance. As the carbon fiber woven fabric, a woven fabric obtained by weaving carbon fiber or a woven fabric obtained by baking woven fabric obtained by weaving precursor fiber of carbon fiber may be used. Also, as the carbon fiber non-woven fabric, a non-woven fabric obtained by processing carbon fiber to a non-woven fabric or a so-called felt-type non-woven fabric obtained by applying processing such as compression to a non-woven fabric obtained by processing precursor fiber of carbon fiber to a non-woven fabric, as necessary, and then baking the resultant may be used. Among carbon fiber-containing porous materials, it is particularly preferred to use a substrate on which a carbon fiber papermaking substrate is bonded with carbide, namely a "carbon paper", because of its excellent mechanical strength. In the present invention, as described below, a substrate on which a carbon fiber papermaking substrate is bonded with carbide can be normally obtained by impregnating a carbon fiber papermaking substrate with a resin and then carbonizing the resultant.

Examples of the carbon fiber include polyacrylonitrile (PAN)-based, pitch-based and rayon-based carbon fibers. Among them, in the present invention, a PAN-based or pitch-based carbon fiber is preferably used because of its excellent mechanical strength.

In order to sufficiently maintain gas diffusivity even the impregnation of the microporous part (B) described below is performed, the thickness of the electrode substrate is preferably 50 μm or more and 190 μm or less. The thickness of the electrode substrate is more preferably 60 μm or more, and more preferably 160 μm or less. This is because that the thickness of the electrode substrate is set at 190 μm or less, whereby the microporous part (B) can be impregnated into the inside of the electrode substrate, and the pore distribution characterized in the present invention can be obtained. Also, when the thickness of the electrode substrate is set at 50 μm or more, gas diffusion in the in-plane direction is increased under ribs of the bipolar plate so that gas can be sufficiently diffused to the catalyst layer under ribs, thereby contributing to the improvement in fuel cell performance.

The thickness of the electrode substrate can be measured using a micrometer under a condition where the electrode substrate is pressurized at a pressure of 0.15 MPa. Herein, the thickness of randomly selected 10 points was measured, and the average value thereof was calculated and defined as the thickness of the electrode substrate.

Here, the thickness of the electrode substrate may be measured using an electrode substrate separated from the gas diffusion electrode substrate. For example, a gas diffusion electrode substrate is heated in the atmosphere at 600° C. for 30 minutes, a resin composition contained in the microporous part in the gas diffusion electrode substrate are oxidatively decomposed, then ultrasonic treatment is carried out in a solvent such as ethanol, whereby a residue of the microporous part can be removed and the electrode substrate can be taken out, and the thickness may be measured in the same manner as above, using the above electrode substrate. Also, the thickness of the substrate in which the microporous part (A) present on its surface is peeled from the gas diffusion electrode substrate may be defined as the thickness of the electrode substrate. Hereinafter, the substrate in which the microporous part (A) present on its surface is peeled from the gas diffusion electrode substrate is sometimes called as the electrode substrate part. For example, an adhesive tape such as "Scotch" (registered trademark) tape #810 (manufactured by 3M) is adhered on the microporous part (A) side of the gas diffusion electrode substrate surface at a pressure of 0.15 MPa. Adhesion and peeling are repeated, and it can be defined that the microporous part (A) can be peeled at the point where mass reduction due to peeling by the adhesive tape is 1% by mass or less, and thus the electrode substrate part can be obtained. The thickness measured by the above-described method for the electrode substrate part can be defined as the thickness of the electrode substrate.

In the present invention, the bulk density of the electrode substrate is preferably 0.2 g/cm$^3$ or more, more preferably 0.22 g/cm$^3$ or more, and further preferably 0.24 g/cm$^3$ or more. Also, the bulk density of the electrode substrate is preferably 0.4 g/cm$^3$ or less, more preferably 0.35 g/cm$^3$ or less, and further preferably 0.3 g/cm$^3$ or less. When the bulk density is 0.2 g/cm$^3$ or more, the water vapor diffusivity is small, and dry-out can be further suppressed, and not only the mechanical properties of the electrode substrate are improved, but also an electrolyte membrane and a catalyst layer can be adequately supported thereon. In addition, high electrical conductivity is attained, and the fuel cell performance is thus improved at both high and low temperatures. Meanwhile, when the bulk density is 0.4 g/cm$^3$ or less, the water removal performance is improved, and flooding can thus be further suppressed.

The bulk density of the electrode substrate can be obtained by cutting out 2-cm square of the electrode substrate as a test piece, measuring the mass thereof, and dividing the mass by a volume that is a product of the thickness of the electrode substrate obtained by the above method and the cut out area (4 cm$^2$) of the test piece. Five samples are measured, and the average thereof is defined as the bulk density. As the test piece to be measured, an electrode substrate separated from the gas diffusion electrode substrate as described above may be used.

In the electrode substrate used in the present invention, as compared to the surface roughness on the side where the microporous part (A) is formed, the surface roughness on the opposite side is preferably larger with a difference of 1 μm or more and 5 μm or less. When there is a certain difference in the surface roughness between both sides of the electrode substrate, a flow is generated in the through-plane direction of the electrode substrate when the microporous part (B) is impregnated, and a structure in which the microporous part (B) is continuous in the through-plane direction is likely to be formed. Therefore, water removal from the microporous part (B) having the pore distribution obtainable in the present invention to the pore formed by the electrode substrate can be promoted. Meanwhile, the difference in the surface roughness is not made too large, whereby the microporous part (B) generates deviation in the through-plane direction, and the loading amount on one electrode substrate surface can be prevented from becoming too large, thus the structure continuous in the through-plane direction can be formed. The difference in the above surface roughness is preferably 2 μm or more, and preferably 4.5 μm or less. Here, the surface roughness of the electrode substrate can be obtained by measuring the range of 5 mm square in the surface of the electrode substrate using a laser microscope or the like, and performing plane tilt correction, then calculating the arithmetic average roughness Ra [μm] on the surface.

In the present invention, it is necessary that, in the gas diffusion electrode substrate, a microporous part (A) is formed on one surface of the electrode substrate. The microporous part (A) is required to have high gas diffusivity for allowing a gas supplied from the bipolar plate to be diffused into the catalyst layer and high water removal performance for discharging liquid water generated by the electrochemical reaction to the bipolar plate, as well as high electrical conductivity for extracting generated electric current. Furthermore, the microporous part (A) has functions of promoting back-diffusion of water to an electrolyte membrane, and wetting the electrolyte membrane.

The thickness of the microporous part (A) is preferably 10 μm or more, and more preferably 15 μm or more. Also, the thickness of the microporous part (A) is preferably 60 μm or less, and more preferably 40 μm or less. When the thickness of the microporous part (A) is 10 μm or more, the electrode substrate surface can be covered so as to isolate the electrode substrate and the catalyst layer, the electrode substrate is prevented from penetrating into the catalyst layer, and not only durability of the electrolyte membrane can be improved, but also back-diffusion of water vapor generated in a cathode to an anode, and dry-out can be further suppressed. Also, when the thickness of the microporous part (A) is 60 μm or less, the thermal conductivity can be increased, thus heat is diffused, whereby not only dry-out of the electrolyte membrane can be further suppressed, and also the water removal performance is improved and flooding can be suppressed.

Here, the thickness of the microporous part (A) can be obtained by subtracting the thickness of the electrode substrate from the thickness of the gas diffusion electrode substrate. The thickness of the gas diffusion electrode substrate can be determined using a micrometer under a condition where the gas diffusion electrode substrate is pressurized at a pressure of 0.15 MPa, as same as the thickness of the electrode substrate. Herein, the thickness of randomly selected 10 points was measured, and the average value thereof was calculated and defined as the thickness of the gas diffusion electrode substrate.

In the present invention, the areal weight of the microporous part (A) is preferably 5 g/m$^2$ or more, more preferably 10 g/m$^2$ or more, and further preferably 16 g/m$^2$ or more. Also, the areal weight of the microporous part (A) is preferably 35 g/m$^2$ or less, more preferably 30 g/m$^2$ or less, further preferably 25 g/m$^2$ or less, and further preferably 20 g/m$^2$ or less. In the present invention, the areal weight means a mass per unit area. When the areal weight of the microporous part (A) is 5 g/m$^2$ or more, the electrode substrate surface can be covered, durability of the electrolyte membrane can be improved, and also back-diffusion of water vapor generated in a cathode to an anode, and dry-out can be suppressed. Also, when the areal weight of the microporous part (A) is 35 g/m$^2$ or less, the water removal performance is further improved and flooding can be further suppressed.

Here, the areal weight of the microporous part (A) can be determined by subtracting the areal weight of the electrode substrate part from the areal weight of the gas diffusion electrode substrate. The areal weight of the gas diffusion electrode substrate and the areal weight of the electrode substrate part can be determined by cutting out a 10-cm square of the substrate as a test piece, and dividing the mass of the test piece by the area (0.01 m²) of the test piece. The electrode substrate part can be taken out from the gas diffusion electrode substrate by the method by peeling described above for the measurement of the thickness of the electrode substrate.

Also, the areal weight of the microporous part (A) may be determined by subtracting the areal weight of the microporous part (B) from the areal weight of the whole microporous part. The areal weight of the whole microporous part may be determined by subtracting the areal weight of the electrode substrate from the areal weight of the gas diffusion electrode substrate. The areal weight of the microporous part (B) may be determined by subtracting the areal weight of the electrode substrate from the areal weight of the electrode substrate in which the microporous part (B) is impregnated, before coating a carbon coating solution of the microporous part (A), or may be determined by subtracting the areal weight of the electrode substrate from the areal weight of the electrode substrate part taken out from the gas diffusion electrode substrate by the method by peeling described above for the measurement of the thickness of the electrode substrate.

In the present invention, the gas diffusion electrode substrate usually has a structure in which the microporous part (B) is impregnated in at least a part of the inside of the electrode substrate. The microporous part (B) is a microporous part impregnated in the inside of the electrode substrate. Here, the term "impregnated" refers to that at least a part of pores formed by the electrode substrate itself is filled with the microporous part (B). The microporous part is usually a porous material with a pore size of less than 10 μm. In order to observe the inside of this electrode substrate, a through-plane cross section of the electrode substrate part is prepared by a cutting method such as ion milling and microtome, and the cross section is observed under an optical microscope or a scanning electron microscope, then when even a part of pores formed by the electrode substrate itself is filled with the microporous part that is a porous material, it can be determined as impregnated. Particularly, when the pore filling rate described below is 10% or more, it is clearly impregnated.

In power generation of a fuel cell in the high current region, particularly in the power generation condition of introducing high humidity fuel gas at a low temperature of the operation temperature, pores with a pore size distributed in the range of 10 μm or more and less than 100 μm present in the inside of the electrode substrate give a large gas diffusion effect, and become a passage of liquid water, but in the power generation condition in the high current region where a large amount of liquid water is generated, the pores become a hindrance of gas diffusion since liquid water stays in the pores. Meanwhile, pores with a pore size distributed in the range of 0.1 μm or more and less than 10 μm do not have large gas diffusion effect, but have an effect of suppressing staying of liquid water in the inside thereof, thus gas can be diffused even under low temperature and high humidity conditions where a large amount of liquid water is generated. Paying attention to this feature, pores with a pore size distributed in the range of 0.1 μm or more and less than 10 μm are increased while appropriately maintaining the volume of the pores with a pore size distributed in the range of 10 μm or more and less than 100 μm, thereby improving water removal performance, thus both gas diffusivity and water removal performance can be satisfied, and good anti-flooding and anti-dry-out characteristics are both obtained. Meanwhile, when the inside of the electrode substrate is excessively impregnated with the small microporous part (B) with a pore size of less than 10 μm, pores with a pore size of 10 μm or more that become a passage of liquid water are reduced, thus liquid water cannot penetrate the small pore and water removal performance of the electrode substrate may be deteriorated, and at the same time, the microporous part inhibits gas diffusion, thus gas diffusivity is also reduced, and sufficient amount of gas cannot be supplied to the catalyst layer, thus fuel cell performance may be deteriorated. As described above, it is important to control the distribution of pore size in the whole gas diffusion electrode substrate.

Next, the optimal distribution of the pore size will be described. Pores formed in the electrode substrate itself, more specifically, pores in which the electrode substrate originally has, have a pore size distributed in the range of 10 μm or more and less than 100 μm, and the pore volume in this range is defined as $V_{(10-100)}$. Meanwhile, pores formed by the microporous part have a pore size distributed in the range of 0.1 μm or more and less than 10 μm, and the pore volume in this range is defined as $V_{(0.1-10)}$. Here, pores with a pore size of 10 μm or more and less than 100 μm give a large gas diffusion effect, and become a passage of liquid water. Meanwhile, when a large amount of liquid water is generated, the pores become a hindrance of gas diffusion since liquid water stays in the pores. Meanwhile, pores with a pore size of 0.1 μm or more and less than 10 μm do not have a large gas diffusion effect as compared to the pores with a pore size of 10 μm or more and less than 100 μm, but have an effect of suppressing staying of liquid water in the inside thereof, thus gas can be diffused via the pores with a pore size of 0.1 μm or more and less than 10 μm even when a large amount of liquid water is generated. The present inventors who intensively studied and discovered movement of water in the gas diffusion electrode substrate have found that, in order to efficiently perform diffusion of fuel gas and discharge of water, the ratio of pore volumes of these two ranges is important, and there is the optimal ratio in this control width.

The specific ratio thereof is that, $V_{(0.1-10)}$ is set in the range of 0.9 times or more and 5 times or less of $V_{(10-100)}$. The ratio of $V_{(0.1-10)}$ to $V_{(10-100)}$ is preferably 1 time or more, and more preferably 1.1 times or more. Also, the ratio of $V_{(0.1-10)}$ to $V_{(10-100)}$ is preferably 3 times or less, and more preferably 2 times or less. When the above ratio is 0.9 times or more, the pores in which the electrode substrate originally has are impregnated with the microporous part and staying of water in a liquid state can be suppressed, thus gas diffusivity is good even under low temperatures and high humidity conditions where a large amount of liquid water is generated, and fuel cell performance can be improved. Also, the above ratio is set at 5 times or less to appropriately maintain $V_{(10-100)}$, whereby gas diffusivity is good, and also the water discharged from small pores can be discharged to the bipolar plate side via large pores even under low temperatures and high humidity conditions. For example, when the means cited in Patent Document 1 is used, the ratio of $V_{(0.1-10)}$ to $V_{(10-100)}$ becomes large such as 8 or more, and the pores in the inside of the electrode substrate are excessively blocked by the microporous part to deteriorate liquid water removal, thus anti-flooding characteristic is deteriorated. It is because the pores with a pore size of 10 μm or more and less than 100 μm were blocked and consequently, gas diffusion was deteriorated.

In order to set the ratio of $V_{(0.1-10)}$ to $V_{(10-100)}$ in the above range, it is effective to impregnate the electrode substrate with the microporous part (B). When the microporous part to be impregnated is more increased, $V_{(0.1-10)}$ can be more increased, and the above ratio can be obtained, for example, by setting the areal weight of the microporous part (B) in the range of 15% or more and 75% or less, with respect to the areal weight of the electrode substrate.

Furthermore, when having a structure in which the microporous part (B) is impregnated in the inside of the electrode substrate, in order to maintain good gas diffusivity while the microporous part (B) has a small pore that is smaller than the pore originally formed by the electrode substrate, it is desirable that the microporous part (B) has moderately large pores. It is because a hydrophobic porous material has a pore with a size around 1 μm, specifically, a pore size in the range of 0.3 to 3 μm, whereby connection between pores formed inside the microporous part (B) is increased, and good gas diffusivity can be provided. Specifically, in the gas diffusion electrode substrate, the pore volume $V_{(0.03-0.3)}$ corresponding to a pore size of 0.03 μm or more to less than 0.3 μm that is a relatively small pore is made smaller than the pore volume $V_{(0.3-3)}$ corresponding to a pore size of 0.3 μm or more to less than 3 μm that is a relatively large pore, whereby a microporous part having excellent gas diffusivity, and good water removal performance of the liquid condensed in the pore can be formed in the inside of the microporous part (B). Whereby, a structure of the electrode substrate part having excellent gas diffusivity and water removal performance can be formed, in the whole gas diffusion electrode, further higher gas diffusivity and water removal performance can be both satisfied. Furthermore, in the electrode substrate in which the microporous part (B) is impregnated, namely, the structure part where the microporous part (B) impregnates at least a part of the pores of the electrode substrate, it is preferred that the pore volume $V_{(0.03-0.3)}$ corresponding to a pore size of 0.03 μm or more to less than 0.3 μm that is a relatively small pore is smaller than the pore volume $V_{(0.3-3)}$ corresponding to a pore size of 0.3 μm or more to less than 3 μm that is a relatively large pore. The electrode substrate in which the microporous part (B) is impregnated corresponds to the electrode substrate part described above. In the gas diffusion electrode substrate or the electrode substrate part or both of them, the ratio of $V_{(0.03-0.3)}$ to $V_{(0.3-3)}$ is more preferably 0.9 times or less, and further preferably 0.8 times or less.

In the gas diffusion electrode substrate or the electrode substrate in which the microporous part (B) is impregnated (electrode substrate part), the method for obtaining the pore size and pore volume thereof includes mercury porosimetry that pressure-injects mercury into pores to grasp permeation, perm porometry that grasps a pressure discharged by applying pressure to a permeated liquid, a method of observing the cross section itself by an electron microscope, and the like. Among them, mercury porosimetry is suitable for quantitatively grasping nanometer pores.

Using the gas diffusion electrode substrate or the electrode substrate in which the microporous part (B) is impregnated (electrode substrate part) as the measuring object substrate, a test piece is cut out from the measuring object substrate, the pore size and pore volume are measured using a porosimeter, and the difference in accumulation of the pore size and pore volume is obtained, whereby $V_{(10-100)}$ and $V_{(0.1-10)}$ in the measuring object substrate can be obtained.

In addition, the pore volume of a part of a pore size of 0.03 μm or more to less than 3 μm is compared, whereby $V_{(0.03-0.3)}$ and $V_{(0.3-3)}$ in the measuring object substrate can be obtained. As the porosimeter, AutoPore IV 9500 manufactured by Shimadzu Corporation or its equivalent product can be used.

The measuring object substrate may be a gas diffusion electrode substrate taken out from a stack of the fuel cell. When taking out a gas diffusion electrode substrate from a stack of the fuel cell, a membrane-electrode assembly is taken out from the stack of the fuel cell, and further the catalyst layer and the gas diffusion electrode substrate may be separated by a blade on a hot plate at 150° C. to take out a gas diffusion electrode substrate. Also, the electrode substrate in which the microporous part (B) is impregnated (electrode substrate part) can be taken out from the gas diffusion electrode substrate by the method described above for the measurement of the thickness of the electrode substrate.

<Composition of Microporous Part>

From the viewpoint of improving electrical conductivity and water removal performance, it is preferred to use a porous material containing a carbon based filler and a water repellent agent in the microporous part. Carbon black is representative as the carbon based filler.

In the present invention, the microporous part (A) laminated in a layer state on the surface of the electrode substrate and the microporous part (B) impregnated in the inside of the electrode substrate may have the same composition, or may have a different composition.

In order to form a pore volume having an appropriate pore size in the microporous part (B) to be impregnated in the electrode substrate, namely, in order to increase the pore volume $V_{(0.3-3)}$, it is desirable that the microporous part (B) contains a filler having an aspect ratio of 30 or more and 5000 or less. As this filler, various whiskers and fibers, and needle crystals can be used. Examples of electrically conductive material include carbon based filler having a specific aspect ratio described below such as fibrous carbon, and in addition, whiskers such as titanium oxide, potassium titanate, and silicon carbide can be used. When using a fibrous carbon having a specific aspect ratio in the microporous part (B), it is preferred to use fibrous carbon having a diameter within the range of 1 nm or more and 500 nm or less. In the case of an electrically non-conductive material, a material subjected to electrically conductive coating on the surface can be also used. Another method for forming pores includes adding a material that extincts in the process of sintering, so-called extinction material, and fine air bubbles to the precursor of the microporous part (B). As the extinction material, one that desorbs by pyrolysis or evaporation in sintering is preferable, and the residual amount of carbonization is desirably 5% by mass or less. Among these methods, it is most desirable to use a carbon based filler having a specific aspect ratio. By using the above carbon based filler, not only high conductivity can be obtained, but also many pores can be formed in the microporous part, thus gas diffusivity can be improved, and excellent gas diffusion electrode substrate can be formed. In addition, a microporous part (A) having sufficient thickness in the electrode substrate surface layer is likely to be formed, thus back-diffusion is further promoted, and dry-out can be further suppressed.

When the aspect ratio of the above carbon based filler is set at 30 or more, entanglement of the carbon based filler in the carbon coating solution is increased, and sufficient pore forming effect can be obtained. Meanwhile, when the aspect ratio of the above carbon based filler is set at 5000 or less, entanglement of the carbon based filler in the carbon coating solution is reduced, and not only aggregation and precipitation of the solid content can be suppressed in the carbon coating solution, but also the carbon coating solution can be uniformly impregnated in the inside of the electrode substrate. In the present invention, the aspect ratio of the carbon based filler is more preferably 35 or more, and further preferably 40 or more. Also, the aspect ratio of the carbon based filler is more preferably 3000 or less, and further preferably 1000 or less.

Here, the aspect ratio of the filler is obtained as described below. When the filler is fibrous, the aspect ratio means mean length (μm)/mean diameter (μm). The mean length is an average value determined by taking a photograph at a magnification of 1000 or more, under a microscope such as a scanning electron microscope or a transmission electron microscope, randomly selecting 10 different fillers, and measuring their lengths. The mean diameter is an average value determined by taking a photograph at a magnification of 1000 or more, under a microscope such as a scanning electron microscope or a transmission electron microscope, randomly selecting 10 different fillers, and measuring their diameters. When the filler is a flake, the aspect ratio means mean particle size (μm)/mean thickness (μm). The mean particle size is a 50% cumulative diameter on a volume basis determined by measuring by use of a laser diffraction particle size distribution analyzer. The mean thickness is an average value determined by taking a photograph at a magnification of 1000 times or more, under a microscope such as a scanning electron microscope or a transmission electron microscope, randomly selecting 10 different fillers, and measuring their thicknesses. As the scanning electron microscope, in any case, S-4800 manufactured by Hitachi, Ltd. or its equivalent product can be used.

As the carbon based filler having a specific aspect ratio, it is preferred to use a fibrous carbon having a specific aspect ratio. Here, the fibrous carbon includes a vapor grown carbon fiber, a single-walled carbon nanotube, a double-walled carbon nanotube, a multi-walled carbon nanotube, a carbon nanohorn, a carbon nanocoil, a cup-layered type carbon nanotube, a bamboo-like carbon nanotube, and a graphite nanofiber. Among them, a vapor grown carbon fiber, a single-walled carbon nanotube, a double-walled carbon nanotube, and a multi-walled carbon nanotube are cited as a fibrous carbon preferred to be used in the present invention, since the aspect ratio can be increased, and their electrical conductivity and mechanical properties are excellent. A vapor grown carbon fiber is one obtained by growing carbon in a vapor phase by a catalyst, and those having a mean diameter of 5 nm or more and 200 nm or less, and a mean fiber length of 1 μm or more and 20 μm or less are preferred. Also, the carbon based filler capable of obtaining one having a specific aspect ratio includes flake graphite, scaly graphite, artificial graphite, expanded graphite, flaky graphite, and the like, other than fibrous carbons, and the carbon based filler that is likely to obtain one having a specific aspect ratio includes flaky graphite, other than fibrous carbons.

In the present invention, when using a fibrous carbon having a specific aspect ratio, the mean length thereof is preferably in the range of 0.1 μm or more and 30 μm or less. The mean length of the fibrous carbon having a specific aspect ratio is more preferably 1 μm or more, and further preferably 2 μm or more. Also, the mean length of the fibrous carbon having a specific aspect ratio is more preferably 20 μm or less, and further preferably 15 μm or less.

When the mean length of the above fibrous carbon is 0.1 μm or more, continuous pores are formed by carbon, and gas diffusivity and water removal performance of the electrode substrate are improved, thus flooding can be suppressed. In the present invention, when using a fibrous carbon having a specific aspect ratio, it is particularly preferred to use fibrous carbon having a diameter in the range of 1 nm or more and 500 nm or less.

In the present invention, it is preferred that the microporous part (A) or (B) or both of them contain a carbon based filler having a specific aspect ratio, and it is also preferred to contain various carbon based fillers other than the carbon based filler described above. The carbon based filler having no specific aspect ratio includes carbon black such as furnace black, acetylene black, lamp black and thermal black, and graphites such as flake graphite, scaly graphite, earthy graphite, artificial graphite, expanded graphite and flaky graphite, in which the aspect ratio is not in the range of 30 or more and 5000 or less, and fibrous carbon such as CNT in which the aspect ratio is not in the range of 30 or more and 5000 or less, and among them, those using carbon black is more preferred, and those using acetylene black is most preferred.

The mixing mass ratio of carbon black to the filler having a specific aspect ratio is preferably in the range of 1 or more and 20 or less, more preferably in the range of 1.5 or more and 19 or less, and further preferably in the range of 2 or more and 10 or less. When the mixing mass ratio described above is 1 or more, the porosity is moderate in the microporous part (A) or (B) or both of them containing a filler having a specific aspect ratio and carbon black, thus water vapor diffusivity is small, and dry-out can be suppressed. When the above mixing mass ratio is 20 or less, gas diffusivity and water removal performance are improved in the microporous part (A) or (B) or both of them by the effect of adding a carbon based filler having a specific aspect ratio, thus flooding can be suppressed, further the microporous part (A) with a sufficient thickness can be formed in the electrode substrate surface layer, and back-diffusion is promoted, thus dry-out can be suppressed.

In the present invention, from the viewpoint of promoting liquid water removal, it is preferred that the microporous part (A) or (B) or both of them contain a water repellent agent in combination with a carbon based filler. Among them, as the water repellent agent, a fluorine-based polymer is preferably used because of its excellent corrosion resistance. The fluorine-based polymer includes polytetrafluoroethylene resins (PTFE), tetrafluoroethylene-hexa fluoro propylene copolymers (FEP), tetrafluoroethylene-perfluoroalkylvinyl ether copolymers (PFA), and the like. In order to obtain a uniform water-repellent state in which melt viscosity on sintering is low, it is preferred to use a water repellent agent having a melting point of 200° C. or more and 320° C. or less, and such water repellent agent includes FEP or PFA. By using these water repellent agents, it is possible to remove liquid water condensed in small pores of the microporous part (B) to large pores, and water removal performance from the large pore to a flow channel of the bipolar plate can be remarkably increased. Whereby, accumulation of water in the inside of the electrode substrate can be reduced, thus gas diffusivity can be greatly improved even in the conditions of generating a large amount of liquid water due to high load power generation, and leads to a great improvement in fuel cell performance.

The content of the water repellent agent in the microporous part (A) or (B) is preferably 5% by mass or more, more preferably 10% by mass or more, and further preferably 15% by mass or more, in a mass ratio to the carbon based filler in the microporous part (value in a case where the mass of the carbon based filler is defined as 100% by mass). Also, the content of the water repellent agent is preferably 50% by mass or less, more preferably 35% by weight or less, and further preferably 30% by mass or less, in a mass ratio to the carbon based filler. The content of the water repellent agent is set in the above range, whereby gas diffusivity of the microporous part can be more improved while having sufficient hydrophobicity.

In the present invention, the porosity of the microporous part (B) is preferably 50% or more, and more preferably 60% or more. Also, the porosity of the microporous part (B) is preferably 90% or less, more preferably 87% or less, and further preferably 80% or less. When the porosity of the microporous part (B) is 50% or more, water removal performance is further improved, and flooding can thus be further suppressed. Further, the microporous part (B) has a large porosity of 60% or more, whereby effective continuous pore is formed, thus gas diffusivity is improved, and a chemical reaction in the catalyst layer is efficiently carried out, thus diffusion polarization depending on the efficiency of gas diffusion and water discharge for the chemical reaction can be reduced. Whereby, certain improvement of fuel cell performance of a fuel cell can be expected. When the porosity of the microporous part (B) is 90% or less, water vapor diffusion is small, and dry-out can be further suppressed. In addition, high electrical conductivity is attained, and the fuel cell performance is further improved at both high and low temperatures. The microporous part (B) having the above porosity is obtained by controlling the areal weight of the microporous part, the addition amount of the carbon based filler based on other materials including the water repellent agent, the type of the carbon based filler, and the thickness of the microporous part, in the production method described below. Among them, it is effective to control the addition amount of the carbon based filler based on other materials including the water repellent agent, and the type of the carbon based filler. Here, a microporous part with a high porosity is obtained by increasing the addition amount of the carbon based filler based on other materials including the water repellent agent and an extinction material, and a microporous part with a low porosity is obtained by decreasing the addition amount of the carbon based filler based on other materials including the water repellent agent and an extinction material.

Also, the porosity of the microporous part (B) is larger than the porosity of the microporous part (A) preferably by 5% or more, and more preferably by 10% or more. In other words, the difference between the porosity of the microporous part (B) and the porosity of the microporous part (A) is preferably 5% or more, and more preferably 10% or more. It is because water removal performance can be improved by utilizing a characteristic that the liquid water condensed in the inside of the microporous part (A) is likely to be removed to the microporous part (B) having high porosity.

Here, the porosity of the microporous part (A) or microporous part (B) is determined by using a sample for through-plane cross-section observation prepared by use of an ion beam cross-section processing apparatus, taking a photograph of a cross-section of each of the microporous parts at a magnification of 5000 times or more and 20000 times or less by imaging using reflected electrons, under a microscope such as a scanning electron microscope, measuring an area of the pore part, and then calculating an area ratio of the pore part to the observed area. At this time, the part of the image with the average brightness or less is considered as a pore, and the pore can be identified by binarization. The average brightness can be obtained as described below. First, in the image analysis, a histogram showing 256 levels of brightness at a horizontal axis and the number of pixels by brightness at a vertical axis is prepared. In the range where the number of pixels is more than or equal to the numerical value obtained by dividing the total number of pixels by 2560 in the histogram, the brightness that is the median of the range is defined as the average brightness. As the scanning electron microscope, S-4800 manufactured by Hitachi, Ltd. or its equivalent product can be used.

In the present invention, it is desirable that the microporous part (B) impregnates 20% or more and 70% or less of the pores formed by the electrode substrate itself. Whereby, the ratio of $V_{(0.1-10)}$ to $V_{(10-100)}$ is easy to set in the proper range. Here, the ratio that the microporous part (B) impregnates and fills the pores formed by the electrode substrate itself is referred to as the pore filling rate. The pore filling rate is obtained as described below. First, a through-plane cross section is each prepared for an electrode substrate in which the microporous part (B) is not impregnated, and a gas diffusion electrode substrate, using ion milling or the like, then the cross section of the electrode substrate and the cross section of the part in which the microporous part (B) is impregnated (electrode substrate part) are magnified 200 times or more and 400 times or less, and photographs in each 10 points are randomly taken, using a low angle reflected electron image in a scanning electron microscope. First, the average brightness (B1) of the images of the cross section in the electrode substrate that is not impregnated is obtained, and the part darker than B1 is defined as the pore area (V1) of the electrode substrate. Next, the average brightness (B2) in the cross section of the electrode substrate part is obtained in the same manner, and the part darker than B2 is defined as the pore area (V2) of the electrode substrate part. The difference between V1 and V2 shows an area filled with the microporous part (B). Accordingly, the ratio of (V1-V2) to V1 is the pore filling rate, and how much of the pores formed by the electrode substrate itself is impregnated by the microporous part (B) can be confirmed.

Next, a production method suitable for obtaining the gas diffusion electrode substrate of the present invention will be concretely described for each step, with reference to an example of the "baked carbon fiber" obtained from a carbon fiber papermaking substrate, as an electrode substrate.

<Papermaking Substrate and Production Method of Papermaking Substrate>

In order to obtain a carbon fiber-containing papermaking substrate, a wet papermaking method in which a carbon fiber-containing paper sheet is produced by dispersing carbon fibers in a liquid, a dry papermaking method in which a carbon fiber-containing paper sheet is produced by dispersing carbon fibers in the air or the like is employed. Among them, a wet papermaking method is preferably employed because of its excellent productivity.

For the purpose of improving the water removal performance and gas diffusivity of the electrode substrate, carbon fibers can be mixed with an organic fiber to make a paper. As the organic fiber, a polyethylene fiber, a vinylon fiber, a polyacetal fiber, a polyester fiber, a polyamide fiber, a rayon fiber, an acetate fiber or the like can be used.

Further, for the purpose of improving the shape-retaining property and ease of handling of the papermaking substrate, an organic polymer can be incorporated as a binder. Here, as the organic polymer, polyvinyl alcohol, polyvinyl acetate, polyacrylonitrile, cellulose or the like can be used.

In order to maintain the in-plane electrical conductivity and thermal conductivity to be isotropic, the papermaking substrate is preferably in the form of a sheet in which carbon fibers are randomly dispersed in a two-dimensional plane.

Although the pore size distribution obtained for the papermaking substrate is influenced by the content rate and dispersion state of the carbon fibers, the pores can be formed at a size of about 20 μm or more and 500 μm or less.

The papermaking substrate has a carbon fiber areal weight preferably in the range of 10 g/m² or more and 100 g/m² or less, and more preferably in the range of 15 g/m² or more and 80 g/m² or less. When the carbon fiber areal weight is 10 g/m² or more, the electrode substrate has excellent mechanical strength, which is preferred. When the carbon fiber areal weight is 100 g/m² or less, the electrode substrate has excellent gas diffusivity and water removal performance, which is also preferred. In cases where a plurality of papermaking substrates are laminated, it is preferred that the post-lamination carbon fiber areal weight be in the above-described range.

Here, the carbon fiber areal weight in the electrode substrate can be determined by retaining a papermaking substrate cut into a 10-cm square under a nitrogen atmosphere in an electric furnace at a temperature of 450° C. for 15 minutes and then dividing the mass of the residue obtained by removal of organic matters by the area of the papermaking substrate (0.01 m²).

<Impregnation of Resin Component>

As a method for impregnating a carbon fiber-containing papermaking substrate with a resin component, a method of dipping a papermaking substrate into a resin component-containing resin composition, a method of coating a papermaking substrate with a resin component-containing resin composition or a method of laminating and transferring a film composed of a resin component onto a papermaking substrate can be employed. Among them, a method of dipping a papermaking substrate into a resin component-containing resin composition is preferably employed because of its excellent productivity.

The resin component is carbonized on baking to yield an electrically conductive carbide. The resin composition refers to a resin component to which a solvent or the like is added as required. Here, the term "resin component" refers to a component which contains a resin such as a thermosetting resin and, as required, an additive (s) such as a carbon based filler and a surfactant.

It is preferred that the carbonization yield of the resin component contained in the resin composition be 40% by mass or more. When the carbonization yield is 40% by mass or more, the electrode substrate attains excellent mechanical properties, electrical conductivity and thermal conductivity, which is preferred.

The resin constituting the resin component includes thermosetting resins such as phenolic resins, epoxy resins, melamine resins and furan resin, and the like. Among them, a phenolic resin is preferably used because of its high carbonization yield. Further, as an additive to be added to the resin component as required, a carbon based filler can be added for the purpose of improving the mechanical properties, electrical conductivity and thermal conductivity of the electrode substrate. Here, as the carbon based filler, a carbon black, a carbon nanotube, a carbon nanofiber, a milled carbon fiber, graphite or flaky graphite can be used.

The resin composition can use a resin component obtained by the above-described constitution as it is, and the resin composition may also contain, as required, a variety of solvents for the purpose of improving impregnation property into a papermaking substrate. Here, as the solvent, methanol, ethanol, isopropyl alcohol or the like can be used.

It is preferred that the resin composition be in a liquid form under a condition of 25° C. and 0.1 MPa. When the resin composition is in a liquid form, it has excellent impregnation property into a papermaking substrate, so that the electrode substrate attains excellent mechanical properties, electrical conductivity and thermal conductivity, which is preferred.

A resin component is impregnated in an amount of preferably 30 parts by mass or more and 400 parts by mass or less, and more preferably 50 parts by mass or more and 300 parts by mass or less, with respect to 100 parts by mass of the carbon fibers. When the amount of the impregnated resin component is 30 parts by mass or more, the electrode substrate has excellent mechanical properties, electrical conductivity and thermal conductivity, which is preferred. Meanwhile, when the amount of the impregnated resin component is 400 parts by mass or less, the electrode substrate has excellent gas diffusivity, which is also preferred.

When impregnating a resin component into a papermaking substrate, a papermaking substrate imparted with a resin component is sandwiched between a roll on which irregularities are formed and a smooth roll to be impregnated, whereby a difference in the loading amount of resin component can be provided between both sides. The surface with an increased loading amount of the resin component has a small surface roughness in the electrode substrate to be obtained.

<Lamination and Annealing>

A prepreg in which a carbon fiber-containing papermaking substrate is impregnated with a resin composition is formed, and then the obtained prepreg can be laminated and/or annealed prior to carbonization.

In order to allow the electrode substrate to have a prescribed thickness, a plurality of such prepregs can be laminated. In this case, a plurality of prepregs having the same properties can be laminated, or a plurality of prepregs having different properties can be laminated. Specifically, it is possible to laminate a plurality of prepregs that are different in terms of the mean diameter and mean length of the carbon fibers, the carbon fiber areal weight of the papermaking substrate, the amount of the impregnated resin component, or the like.

In order to increase viscosity of the resin composition or partially cross-link the resin composition, the prepreg can be subjected to annealing. As an annealing method, a method of blowing hot air against the prepreg, a method of heating the prepreg by sandwiching it between hot platens of a press apparatus, a method of heating the prepreg by sandwiching it between continuous belts or the like can be employed.

<Carbonization>

After impregnating the carbon fiber-containing papermaking substrate with the resin composition, the resulting papermaking substrate is baked in an inert atmosphere to perform carbonization. For this baking, a batch-type heating furnace or a continuous heating furnace can be used. Further, the inert atmosphere can be obtained by allowing an inert gas such as nitrogen gas or argon gas to flow in the heating furnace.

The highest temperature in the baking is preferably in the range of 1300° C. or more and 3000° C. or less, more preferably in the range of 1700° C. or more and 3000° C. or less, and further preferably in the range of 1900° C. or more and 3000° C. or less. When the highest temperature is 1300° C. or more, carbonization of the resin component is facilitated, so that the electrode substrate attains excellent electrical conductivity and thermal conductivity, which is preferred. Meanwhile, when the highest temperature is 3000° C. or less, the operating cost of the heating furnace is reduced, which is also preferred.

It is preferred that the temperature rising rate in the baking be in the range of 80° C./min or more and 5000° C./min or less. When the temperature rising rate is 80° C./min or more, excellent productivity is preferably attained. Meanwhile, when the temperature rising rate is 5000° C./min or less, carbonization of the resin component slowly proceeds and a dense structure is formed, thus the electrode substrate attains excellent electrical conductivity and thermal conductivity, which is preferred.

A carbon fiber-containing papermaking substrate which is impregnated with a resin composition and then carbonized is referred to as "baked carbon fiber".

<Hydrophobic Treatment>

In order to improve the water removal performance, the baked carbon fiber is preferably subjected to a hydrophobic treatment. The hydrophobic treatment can be performed by coating a water repellent agent on the baked carbon fiber and subsequently annealing the coated baked carbon fiber. Here, as the water repellent agent, a fluorine-based polymer is preferably used because of its excellent corrosion resistance. The fluorine-based polymer includes polychlorotrifluoroethylene resins (PCTFE), polytetrafluoroethylene resins (PTFE), polyvinylidene fluoride resins (PVDF), tetrafluoroethylene-hexa fluoro propylene copolymers (FEP), tetrafluoroethylene-perfluoroalkylvinyl ether copolymers (PFA), tetrafluoroethylene-ethylene copolymers (ETFE), and the like. The amount of the coated water repellent agent is preferably 1 part by mass or more and 50 parts by mass or less, more preferably 2 parts by mass or more and 40 parts by mass or less, and further preferably 3 parts by mass or more and 30 parts by mass or less, with respect to 100 parts by mass of the baked carbon fiber. When the amount of the coated water repellent agent is 1 part by mass or more, the electrode substrate has excellent water removal performance, which is preferred. Meanwhile, when the amount of the coated water repellent agent is 50 parts by mass or less, the electrode substrate has excellent electrical conductivity, which is also preferred.

It is noted here that, a baked carbon fiber subjected to a hydrophobic treatment as necessary is described as an "electrode substrate". When a baked carbon fiber is not subjected to a hydrophobic treatment, the baked carbon fiber and "electrode substrate" refer to the same one.

<Formation of Microporous Parts>

A carbon coating solution is coated or impregnated entirely or partly on the electrode substrate at one time or in plural times, and dried to form a microporous part precursor, then sintered to form a microporous part. In order to obtain a preferred pore size distribution in the present invention, it is important to optimally design the viscosity of coating liquid to be impregnated, coating method, drying method, and the thickness of the electrode. First, it is preferred that the carbon coating solution has a low viscosity, and that the viscosity when measured by an E-type viscometer at a cone angle of 2° and a shear rate of 17 $s^{-1}$ is 8 Pas or less, and further preferably 5 Pas or less. For uniform impregnation, the carbon coating solution may contain isopropyl alcohol or ethanol, in addition to water, as the dispersion medium. The carbon coating solution is constituted by at least a carbon based filler and a dispersion medium.

The dispersion medium is not particularly limited, but water, alcohols and ethers are used, and water is desirable considering environmental effects. The carbon coating solution may contain a dispersant such as a surfactant, a water repellent agent, and other additives. The water repellent agent may also act as the dispersion medium. It is more preferred to use a nonionic surfactant as the dispersant. As the additive, a catalyst for improving performance of a fuel cell and one enhancing water retention function, one that traps impurities and the like can be considered.

Particularly, in order to form a microporous part (B), it is effective that the carbon coating solution contains 30% by mass or more of a filler having an aspect ratio of 30 or more and 5000 or less in the solid content. The carbon coating solution is coated or dipped on one surface of the electrode substrate to be impregnated in the inside of the electrode substrate. Subsequently, the electrode substrate was dried to form a precursor of a microporous part (B), then sintered to form a microporous part (B). In the process, a dispersion medium having low boiling point or decomposition point is decomposed and removed, and when containing a water repellent agent, the water repellent agent is dissolved.

In order to obtain a gas diffusion electrode substrate having the specific pore distribution described above, it is also good to rapidly heat the electrode substrate on its drying. The temperature rising rate is desirably 250° C./min or more and further desirably 400° C./min or more. Meanwhile, when the temperature rising rate is too high, it is problematic since volatile matters are explosively evaporated, and the microporous part (B) has a fragile structure, thus the temperature rising rate is desirably 3000° C./min or less. It is because that the volatile matters such as dispersion medium are dried and removed at once due to rapid heating, while the precursor remains in the inside of the electrode substrate. Furthermore, the carbon coating solution contains a filler with a high aspect ratio, whereby the gas diffusion electrode substrate having specific pore volume distribution described above is likely to be obtained. The carbon coating solution contains a filler with a high aspect ratio, whereby a flow of the precursor to be a microporous part (B) can be suppressed while properly forming pores, and deviation of impregnation structure in the electrode substrate due to drying is unlikely to be generated. Therefore, good pore distribution with the pore volume of large pores having a pore size of 0.1 µm or more and less than 10 µm can be formed while keeping the impregnation structure of the microporous part (B) inside the electrode substrate. By adopting such conditions, aggregation of the microporous part (B) on one surface of the electrode substrate can be prevented, and an impregnation structure that performs gas diffusion and efficient discharge of water can be prepared without inhibiting water removal.

As described above, the thickness of the electrode substrate to be used is preferably 50 µm or more and 190 µm or less, and the microporous part can be uniformly impregnated also in the inside of the electrode substrate in this region, thus an optimal balance of distribution can be formed in the pore size distributions of the electrode substrate and the microporous part after drying and sintering.

The microporous part (A) can be formed by coating a carbon coating solution on one surface of the electrode substrate, and drying and sintering it. The microporous part (A) and the microporous part (B) may have the same composition, and for example, when coating from one surface of the electrode substrate, the carbon coating solution may be impregnated so as to infiltrate into the electrode substrate to simultaneously form the microporous part (A) and the microporous part (B). In this case, the part that is outside the electrode substrate covering the surface becomes a microporous part (A), and the part in which the carbon coating solution is impregnated to infiltrate into the inside of the electrode substrate becomes a microporous part (B). It is also possible to impregnate a carbon coating solution to be the microporous part (B) in the electrode substrate, then coat a carbon coating solution to be the microporous part (A) on one surface of the electrode substrate. In this case, the carbon coating solution to be the microporous part (B) is impregnated, and immediately thereafter, the carbon coating solution to be the microporous part (A) may be coated, or the carbon coating solution to be the microporous part (B) is impregnated, and dried or sintered, then the carbon coating solution to be the microporous part (A) may be coated. In either case, after coating the carbon coating solution to be the microporous part (A), drying and sintering are performed.

The coating of the carbon coating solution onto the electrode substrate can be carried out using a variety of commercially available coating apparatuses. As a coating system, screen printing, rotary screen printing, spraying, intaglio printing, gravure printing, die coating, bar coating, blade coating or the like can be employed. The coating methods exemplified above are presented for the illustration purpose only, and the coating method is not necessarily restricted thereto.

After the coating of the carbon coating solution onto the electrode substrate, it is preferred to dry it at a temperature of 80° C. or more and 200° C. or less. That is, the coated matter is placed in a dryer whose temperature is set at 80° C. or more and 200° C. or less and dried in the range of 2 minutes or more and 30 minutes or less. Drying may be performed in the atmosphere or performed in an inert gas such as nitrogen gas.

As described above, solid contents in the carbon coating solution (carbon based filler, water repellent agent, surfactant, etc.) are remained after drying, and a microporous part precursor is formed.

The dried coated matter is placed in a muffle furnace, a baking furnace or a high-temperature drying furnace and heated at 300° C. or more and 380° C. or less, for 5 minutes or more and 20 minutes or less to melt the water repellent agent, and sintering is performed with the melted water repellent agent as a binder of the carbon based fillers, thereby forming microporous parts.

In the present invention, a membrane electrode assembly can be constituted by binding the above-described gas diffusion electrode substrate on at least one surface of a solid polymer electrolyte membrane having a catalyst layer on both sides. At this time, when the microporous part (A) is arranged on the catalyst layer side, back-diffusion of the generated water is more likely to occur, and also the contact area between the catalyst layer and the gas diffusion electrode substrate is increased, so that the contact electrical resistance can be reduced.

The fuel cell is constituted by having bipolar plates on both sides of the above membrane electrode assembly. Usually, a polymer electrolyte fuel cell is constituted by laminating a plurality of the above membrane electrode assemblies that are sandwiched by bipolar plates from both sides via a gasket. The catalyst layer is composed of a layer containing a solid polymer electrolyte and a carbon material of carbon-supported catalyst. As the catalyst, platinum is usually used. In a fuel cell in which a carbon monoxide-containing reformed gas is supplied to the anode side, it is preferred to use platinum and ruthenium as catalysts of the anode side. As the solid polymer electrolyte, it is preferred to use a perfluorosulfonic acid-based polymer material having high protonic conductivity, oxidation resistance, and heat resistance. The constitutions themselves of the above fuel cell unit and fuel cell are well known.

EXAMPLES

Hereinbelow, the present invention will be concretely described by way of examples and comparative examples. The materials, the method for producing an electrode substrate, and the method for producing a gas diffusion electrode substrate that are used in the examples and comparative examples, and various evaluation methods such as the battery performance evaluation method of fuel cell, are described below.

<Materials>

A: Carbon Based Filler

Vapor phase growth carbon fibers "VGCF-H" (registered trademark) (manufactured by SHOWA DENKO K.K., mean diameter: 0.15 μm, mean fiber length: 8 μm, aspect ratio: 50, a kind of fibrous carbon)

Multi-walled carbon nanotube (manufactured by Cheap Tubes Inc, mean diameter: 0.015 μm, mean fiber length: 20 μm, aspect ratio: 1300, a kind of fibrous carbon)

"DENKA BLACK" (registered trademark) (acetylene black, manufactured by Denka Company Limited, mean particle size: 0.035 μm, aspect ratio: 1)

B: Oxide Based Filler

Needle titanium oxide "TFL-300" spherical (manufactured by ISHIHARA SANGYO KAISHA, LTD., length: 10 μm, aspect ratio: 5 to 20)

C: Extinction Material

PMMA beads "SSX-102" (registered trademark) spherical (manufactured by SEKISUI PLASTICS CO., Ltd., particle diameter: 2 μm, aspect ratio: 1, carbonization yield when stored at 380° C. for 10 minutes: 0.5% or less)

D: Water Repellent Agent

PTFE resin "POLYFLON" (registered trademark) D-1E (manufactured by Daikin Industries, Ltd.)

FEP resin "NEOFLON" (registered trademark) ND-110 (manufactured by Daikin Industries, Ltd.)

E: Surfactant

"TRITON" (registered trademark) X-100 (nonionic surfactant, manufactured by Nacalai Tesque, Inc.)

<Preparation of Electrode Substrate>

Carbon fibers were cut at a mean length of 12 mm and dispersed in water to continuously make a paper by a wet papermaking method. Further, a 10% by mass aqueous solution of polyvinyl alcohol was coated as a binder and then dried to prepare a papermaking substrate having a carbon fiber areal weight of 37.5 g/m$^2$. The amount of the coated polyvinyl alcohol was 22 parts by mass with respect to 100 parts by mass of the papermaking substrate.

Using a mixture of a resol type phenolic resin and a novolak type phenolic resin as a thermosetting resin, a flake graphite as a carbon based filler and methanol as a solvent, the materials were mixed at a ratio of thermosetting resin/carbon based filler/solvent=10 parts by mass/5 parts by mass/85 parts by mass, and the resulting mixture was stirred for 1 minute using an ultrasonic dispersion apparatus to obtain a uniformly dispersed resin composition. The carbonization yield of this thermosetting resin was about 50%.

The papermaking substrate was cut into a size of 15 cm×12.5 cm and dipped into the resin composition filled in an aluminum tray, thereby impregnating 130 parts by mass of the resin component (thermosetting resin+carbon based filler) with respect to 100 parts by mass of the carbon fibers, then the papermaking substrate was dried by heating at 100° C. for 5 minutes to prepare a prepreg. Next, the prepreg was annealed at 180° C. for 5 minutes while being pressurized by a pressing machine with flat plates. Here, the thickness of the annealed prepreg was adjusted by arranging a spacer in the pressing machine with flat plate when pressurizing.

A substrate with the annealed prepreg was introduced into a heating furnace having the highest temperature of 2400° C., in which a nitrogen gas atmosphere was maintained, to obtain a baked carbon fiber.

At that time, the pore size distribution of the baked carbon fiber has 95% or more of the pore volume in the range of 10 µm or more and less than 100 µm, with a peak at 30 µm.

Then, a PTFE resin "POLYFLON" (registered trademark) D-1E was coated so as to have an adhered resin amount after drying of 5 parts by mass with respect to 100 parts by mass of the baked carbon fiber, and the resultant was dried by heating at 100° C. for 5 minutes to prepare an electrode substrate 1 with an areal weight of 30 g/m$^2$ and a thickness of 100 µm.

Also, an electrode substrate 2 with an areal weight of 45 g/m$^2$ and a thickness of 150 µm was obtained in the same manner, except for setting the carbon fiber areal weight at 56 g/m$^2$, and an electrode substrate 3 with an areal weight of 60 g/m$^2$ and a thickness of 200 µm was obtained in the same manner, except for setting the carbon fiber areal weight at 72 g/m$^2$. The bulk density of the electrode substrates 1 to 3 was all 0.28 g/cm$^2$.

<Formation of Precursor of Microporous Part (B)>

A carbon coating solution containing a carbon based filler and a water repellent agent was prepared by adjusting its viscosity to 5 Pas or less by a B-type viscometer. An electrode substrate was dipped in this coating liquid, and left for 10 minutes, then taken out into the atmosphere, and squeezed with a roll to remove excess impregnation liquid, then introduced into a drying furnace at a temperature rising rate of 200° C./min, and dried in the drying furnace at 100° C. for 10 minutes. The carbon coating solution used herein was prepared by using a carbon based filler and a water repellent agent adjusted to have a composition ratio shown in Tables 1 to 3, adding 32 parts by mass of a surfactant with respect to 100 parts by mass of the carbon based filler, and adjusting the mixture with purified water. The areal weight of the impregnated microporous part (B) was adjusted by removal of excess carbon coating solution using a roller, repeated impregnation or the like to obtain a target areal weight amount.

<Formation of Precursor of Microporous Part (A)>

The surface of the electrode substrate on which a precursor of the microporous part (B) was formed was coated with a carbon coating solution in a planar form so as to have an areal weight of 15 g/m$^2$ after sintering, with a die coater, and then dried at 150° C. for 10 minutes to form a precursor of a planar microporous part (A). The carbon coating solution used herein was used by mixing 5.5 parts of DENKA BLACK as the carbon based filler, 2.2 parts of VGCF, 2.5 parts of POLYFLON as the water repellent agent, 15 parts of TRITON X-100 as the surfactant, and 100 parts of purified water. Also, when the porosity was measured by the method described in the <Measurement Method of Porosity> described below, the porosity of the microporous part (A) was 71%.

<Sintering>

An electrode substrate forming the microporous part precursor was heated in the atmosphere at 380° C. for 10 minutes, and removal of the surfactant and sintering of the water repellent agent were performed to form a microporous part on the electrode substrate.

<Measurement of Pore Size and Pore Volume>

For the resulting gas diffusion electrode substrate, the pore size and pore volume were measured by mercury porosimetry. First, two 40 mm square test pieces were cut out from the gas diffusion electrode substrate, and the pore size and pore volume were measured using AutoPore IV 9500 manufactured by Shimadzu Corporation. The pore volume contained in the range of the pore size to be obtained was obtained, thereby obtaining $V_{(10-100)}$ and $V_{(0.1-10)}$ in the gas diffusion electrode substrate. In addition, the pore volume of a pore size in the range of 0.03 µm and more to less than 0.3 µm was compared with the pore volume of a pore size in the range of 0.3 µm or more and less than 3 µm, thereby obtaining $V_{(0.03-0.3)}$ and $V_{(0.3-3)}$ in the gas diffusion electrode substrate, and the ratio thereof was calculated.

Further, in order to measure the pore size and pore volume of the electrode substrate in which the microporous part (B) was impregnated, the microporous part (A) present on the surface of the electrode substrate was peeled from the gas diffusion electrode substrate, and the electrode substrate in which the microporous part (B) was impregnated (electrode substrate part) was taken out. As a method of taking out the electrode substrate part, "Scotch" (registered trademark) tape #810 (manufactured by 3M) was adhered on the microporous part (A) side of the surface of the gas diffusion electrode substrate at a pressure of 0.15 MPa, and peeled. Adhesion and peeling were repeated, and it was defined that the microporous part (A) could be peeled at the point of time when mass reduction by peeling with the tape was 1% by mass or less, and thus the electrode substrate part was obtained. The pore size and pore volume of the electrode substrate part were measured in the same manner, thereby obtaining $V_{(0.03-0.3)}$ and $V_{(0.3-3)}$ in the electrode substrate in which the microporous part (B) was impregnated (electrode substrate part), and the ratio thereof was calculated.

<Measurement of Various Thickness>

When the gas diffusion electrode substrate or electrode substrate was an object to be measured, 10 points to be measured were randomly selected from the objects to be measured, and the individual thickness was measured by a micrometer by pressurizing at 0.15 MPa in the through-plane direction by a terminal with a round tip size of 3 mm in diameter, then the individual thickness at 10 points were averaged, and was defined as the thickness of the object to be measured. The through-plane direction means a direction orthogonal to the substrate surface. The thickness of the microporous part (A) was defined as a value obtained by subtracting the thickness of the electrode substrate from the thickness of the whole gas diffusion electrode substrate.

<Measurement of Areal Weight of Microporous Part>

First, mass [g] (W1) of the electrode substrate was measured in a shape of a 10 cm square using a precision scale. The numerical value obtained by dividing W1 by 0.01 was defined as the areal weight [g/m$^2$] of the electrode substrate.

Next, mass [g] (Wt) of the gas diffusion electrode substrate was measured in a shape of a 10 cm square using a precision scale. The numerical value obtained by dividing Wt by 0.01 was defined as the areal weight [g/m$^2$] of the gas diffusion electrode substrate.

Next, the electrode substrate on which the precursor of the microporous part (B) was formed was heated in the atmosphere at 380° C. for 10 minutes to obtain an electrode substrate in which the microporous part (B) was impregnated, then the mass [g] thereof (W2) was measured in a shape of a 10 cm square in the same manner. The numerical value obtained by subtracting W1 from W2 and dividing this value by 0.01 was defined as the areal weight [g/m$^2$] of the microporous part (B).

The numerical value obtained by subtracting mass W1 of the electrode substrate from mass Wt of the gas diffusion electrode substrate and dividing this value by 0.01 was defined as the areal weight [g/m$^2$] of the whole microporous part. Moreover, the areal weight [g/m$^2$] of the microporous part (B) was subtracted from the areal weight [g/m$^2$] of the whole microporous part, and this value was defined as the areal weight [g/m$^2$] of the microporous part (A).

<Measurement Method of Pore Filling Rate>

A through-plane cross section was each prepared for an electrode substrate in which the microporous part (B) was not impregnated, and a gas diffusion electrode substrate, using ion milling, then the cross section of the electrode substrate and the cross section of the electrode substrate in which the microporous part (B) was impregnated (electrode substrate part) were magnified 400 times, and photographs in each 10 points were randomly taken, using a low angle reflected electron image in a scanning electron microscope (S-4800 manufactured by Hitachi, Ltd.). First, the average brightness (B1) of the images of the cross section in the electrode substrate that was not impregnated was obtained, and the part darker than B1 was defined as the pore area (V1) of the electrode substrate. Next, the average brightness (B2) in the cross section of the electrode substrate part was obtained in the same manner, and the part darker than B2 was defined as the pore area (V2) of the electrode substrate part. The ratio (%) of (V1-V2) to V1 was obtained, and defined as the pore filling rate. Here, as the electrode substrate in which the microporous part (B) was not impregnated, an electrode substrate from which the microporous part was removed was used, by the method described in < Measurement of Areal Weight of Microporous Part>. The pore filling rate was obtained as described above, thereby obtaining the ratio that the microporous part (B) occupies in the pores formed by the electrode substrate itself.

<Measurement Method of Porosity>

Using the through-plane cross section of the gas diffusion electrode substrate prepared in <Measurement Method of Pore Filling Rate>, the cross section of the microporous part (B) was magnified 10000 times using a scanning electron microscope (S-4800 manufactured by Hitachi, Ltd.), and a photograph was taken by imaging using reflected electrons. Then, the area of the pore part was measured, and the area ratio of the pore part to the observation area was obtained. At that time, the part of the image with the average brightness or less was considered as a pore, and the pores were identified by binarization. Here, the average brightness was obtained as described below. First, in the image analysis, a histogram showing 256 levels of brightness at a horizontal axis and the number of pixels by brightness at a vertical axis was prepared. In the range where the number of pixels was more than the numerical value obtained by dividing the total number of pixels by 2560 in the histogram, the brightness that was the median of the range was defined as the average brightness.

<Measurement of Melting Point of Water Repellent Agent>

The melting point of the water repellent agent was measured by differential scanning calorimetric analysis. Using DSC6220 manufactured by Seiko Instruments Inc. (SII) as the apparatus, the temperature was changed from 30° C. to 400° C. at a heating rate of 2° C./min in nitrogen. The endothermic and exothermic peaks at that time were observed, and the endothermic peak at a temperature of 150° C. or more was defined as the melting point of the water repellent agent.

<Measurement of Surface Roughness>

The surface roughness of the electrode substrate was measured using a laser microscope. The measurement was performed by scanning a 5 mm square range with an objective lens with a magnification of 10, using VK-X100 (manufactured by KEYENCE CORPORATION) as a measuring apparatus, and plane tilt correction was performed, then the arithmetic average roughness (Ra) in the 5 mm square was obtained. The measurement was performed for randomly selected 10 points, and the average of arithmetic average roughness at each point was defined as the surface roughness [μm].

<Evaluation of Fuel Cell Performance of Polymer Electrolyte Fuel Cell>

A catalyst paste was prepared by sequentially adding 1.00 g of a carbon material of carbon-supported platinum catalyst (manufactured by Tanaka Kikinzoku Kogyo K.K., platinum supporting amount: 50% by mass), 1.00 g of purified water, 8.00 g of "Nafion" (registered trademark) solution (manufactured by Aldrich, "Nafion" (registered trademark), 5.0% by mass) and 18.00 g of isopropyl alcohol (manufactured by Nacalai Tesque, Inc.).

Then, on a "NAFLON" (registered trademark) PTFE tape "TOMBO" (registered trademark) No. 9001 (manufactured by NICHIAS Corporation) which was cut into a size of 7 cm×7 cm, the obtained catalyst paste was coated using a spray and dried at room temperature to prepare a PTFE sheet equipped with a catalyst layer having a platinum amount of 0.3 mg/cm$^2$. Then, a solid polymer electrolyte membrane, "Nafion" (registered trademark) NRE-211CS (manufactured by DuPont) which was cut into a size of 10 cm×10 cm was sandwiched with two catalyst layer-equipped PTFE sheets. The resultant was pressed at 130° C. for 5 minutes while pressurizing at 5 MPa using a pressing machine with flat plates, thereby transferring the respective catalyst layers onto the solid polymer electrolyte membrane. After pressing, the PTFE sheets were removed to prepare a catalyst layer-equipped solid polymer electrolyte membrane.

Next, the obtained catalyst layer-equipped solid polymer electrolyte membrane was sandwiched with two gas diffusion electrode substrates cut into a size of 7 cm×7 cm, and the resultant was pressurized at 130° C. for 5 minutes while pressurizing at 3 MPa using a pressing machine with flat plates, thereby preparing a membrane electrode assembly. It is noted here that the gas diffusion electrode substrate was arranged such that the surface having the planar microporous part was in contact with the catalyst layer.

The obtained membrane electrode assembly was incorporated into a fuel cell evaluation unit cell to measure the voltage when the current density was changed. Here, as a bipolar plate, a serpentine-type bipolar plate having one flow channel of 1.5 mm in channel width, 1.0 mm in channel depth and 1.1 mm in rib width was used. Further, the evaluation was carried out with hydrogen pressurized at 210 kPa and air pressurized at 140 kPa being supplied to the anode side and the cathode side, respectively. The hydrogen and air were both humidified using a humidification pot whose temperature was set at 40° C. Also, the utilization ratios of the hydrogen and atmospheric oxygen were set at 80% and 67%, respectively.

First, the current density when the output voltage was 0.2 V at an operation temperature of 40° C. and a humidification temperature of 40° C. was measured, and the measured value was used as an index of the anti-flooding characteristic (low-temperature performance). Next, the current density when the output voltage was 0.2 V at a humidification temperature of 80° C. and an operation temperature of 80° C. was measured, and the measured value was used as an index of the anti-dry-out characteristic (high-temperature performance).

Examples 1 to 5

A precursor of the microporous part (B) was formed on the electrode substrate 1 prepared according to <Preparation of Electrode Substrate>, using the carbon coating solution shown in Table 1, according to the method described in <Formation of Precursor of Microporous Part (B)>, then the gas diffusion electrode substrate shown in Table 1 was obtained according to the methods described in <Formation of Precursor of Microporous Part (A)> and <Sintering>. At that time, the ratio of the pore volume $V_{(0.1-10)}$ to $V_{(10-100)}$ is between 1 and 5 that is in the target range. As a result of evaluating fuel cell performance using this gas diffusion electrode substrate, as shown in Table 1, good anti-flooding and anti-dry-out characteristics were both obtained without deteriorating the anti-dry-out characteristic.

Examples 6 to 12

A precursor of the microporous part (B) was formed on the electrode substrate 1 prepared according to <Preparation of Electrode Substrate>, using the carbon coating solution shown in Table 1 or 2, according to the method described in <Formation of Precursor of Microporous Part (B)>, then the gas diffusion electrode substrate shown in Table 1 or 2 was obtained according to the methods described in <Formation of Precursor of Microporous Part (A)> and <Sintering>. Here, for the pore formation of the microporous part (B), a vapor grown carbon fiber was used in Examples 6 to 9, a multi-walled carbon nanotube was used in Example 10, and an extinction material and needle titanium oxide were used in Examples 11 and 12. As a result, it can be seen that the ratio of the pore volume $V_{(0.3-3)}$ to $V_{(0.0.3-0.3)}$ in the microporous part (B) was 1 or less, and the size of the pores in the microporous part (B) was increased. As a result of the power generation evaluation using this gas diffusion electrode substrate, the anti-flooding characteristic was improved overall, greatly improved in Examples 6 to 9, and extremely greatly improved particularly in Example 9. This is considered to be because a fibrous carbon having high aspect ratio is used as the carbon based filler, and not only the pore size was increased, but also electrical resistance could be reduced by its electrical conductivity. In Example 9, this is considered to be because the porosity of the microporous part (B) was increased more than the porosity of the microporous part (A), whereby water removal performance was further improved, thus the performance could be improved.

Examples 13 to 15

A gas diffusion electrode substrate was obtained in the same manner as in Example 1, except for controlling the loading amount of the resin composition in both sides of the electrode substrate in <Impregnation of Resin Composition> to change the surface roughness in both sides. Here, as shown in Table 2, the electrode substrate 1 with a thickness of 100 μm and an areal weight of 25 g/m² as the electrode substrate was used. At that time, the ratio of the pore volume $V_{(0.1-10)}$ to $V_{(10-100)}$ was almost same as in Example 2. As a result of evaluating fuel cell performance using this gas diffusion electrode substrate, as shown in Table 2, good anti-flooding and anti-dry-out characteristics were both obtained without deteriorating the anti-dry-out characteristic. Since the difference in the surface roughness between both sides of the electrode substrate was optimal particularly in Example 14, the optimal internal structure of the electrode substrate was obtained, thus the fuel cell performance was also extremely greatly improved.

Examples 16 to 19

A gas diffusion electrode substrate was obtained in the same manner as in Example 2, except for using a FEP resin in place of the PTFE resin as the water repellent agent of the carbon coating solution in <Formation of Precursor of Microporous Part (B)>, and changing the composition of the carbon coating solution as shown in Table 2. Here, as shown in Table 2, the electrode substrate 1 with a thickness of 100 μm and an areal weight of 25 g/m² as the electrode substrate was used. As a result of evaluating fuel cell performance using this gas diffusion electrode substrate, as shown in Table 2, the anti-dry-out characteristic was improved, and the anti-flooding characteristic was greatly improved in Example 16 and Example 17, as compared to the comparative examples. Also, particularly in Example 19, the ratio of the pore volume $V_{(0.3-3)}$ to $V_{(0.0.3-0.3)}$ in the microporous part (B) was 1 or less, and the size of the pores in the microporous part (B) was increased, whereby both good water removal performance and gas diffusivity could be satisfied, the anti-dry-out characteristic was also greatly improved, and the anti-flooding characteristic was extremely greatly improved.

Example 20

A precursor of the microporous part (B) was formed on the electrode substrate 2 prepared according to <Preparation of Electrode Substrate>, using the carbon coating solution shown in Table 2, according to the method described in <Formation of Precursor of Microporous Part (B)>, then the gas diffusion electrode substrate shown in Table 2 was obtained according to the methods described in <Formation of Precursor of Microporous Part (A)> and <Sintering>. As a result of evaluating fuel cell performance using this gas diffusion electrode substrate, as shown in Table 2, the anti-flooding and anti-dry-out characteristics were both greatly improved and were good.

Example 21

A precursor of the microporous part (B) was formed on the electrode substrate 3 prepared according to <Preparation of Electrode Substrate>, using the carbon coating solution shown in Table 2, according to the method described in <Formation of Precursor of Microporous Part (B)>, then the gas diffusion electrode substrate shown in Table 2 was obtained according to the methods described in <Formation of Precursor of Microporous Part (A)> and <Sintering>. As a result of evaluating fuel cell performance using this gas diffusion electrode substrate, as shown in Table 2, the anti-flooding characteristic was slightly improved more than before. This is considered to be because, while impregnation of the microporous part in the inside of the electrode substrate was insufficient due to the thick electrode substrate, water removal performance could be improved by impregnation while partly having gas diffusivity.

Example 22

A precursor of the microporous part (B) was formed on the electrode substrate 1 prepared according to <Preparation of Electrode Substrate>, using the carbon coating solution shown in Table 2, according to the method described in <Formation of Precursor of Microporous Part (B)>, then the gas diffusion electrode substrate shown in Table 2 was obtained according to the methods described in <Formation of Precursor of Microporous Part (A)> and <Sintering>, except for setting the areal weight of the microporous part (A) at 30 g/m². As a result of evaluating fuel cell performance using this gas diffusion electrode substrate, as shown in Table 2, the anti-dry-out characteristic was slightly improved more than before, and the anti-flooding characteristic was same as before. This is considered to be because, moisture retention was improved since diffusion of water was suppressed due to the thick microporous part (A), and the anti-dry-out characteristic was improved, thus while gas diffusivity in the microporous part (A) was deteriorated, performance could be maintained without deteriorating the anti-flooding characteristic, by the improvement of water removal performance in the inside of the electrode substrate.

Comparative Example 1

Using the electrode substrate 1 prepared according to <Preparation of Electrode Substrate>, a gas diffusion electrode substrate having a planar microporous part in the catalyst layer side of the electrode substrate, shown in Table 3, was obtained according to the methods described in <Formation of Precursor of Microporous Part (A)> and <Sintering>. As a result of evaluating fuel cell performance of this gas diffusion electrode substrate, the anti-flooding and anti-dry-out characteristics were insufficient, as shown in Table 3.

The cause of insufficient anti-flooding characteristic in Comparative Example 1 was that liquid water stayed inside the pores due to the large pore volume $V_{(10-100)}$ thus water removal performance was deteriorated, and gas diffusion through the region of $V_{(0.01-10)}$ having hydrophobicity became insufficient. On the other hand, the reason for poor anti-dry-out characteristic is that gas diffusion is large due to the small region of $V_{(0.01-10)}$, and water is discharged from the catalyst layer as water vapor, thus dry-out is caused.

Comparative Examples 2 to 4

A precursor of the microporous part (B) was formed on the electrode substrate 1 prepared according to <Preparation of Electrode Substrate>, using the carbon coating solution shown in Table 3, according to the method described in <Formation of Precursor of Microporous Part (B)>, except for setting the temperature rising rate at 20° C./min, then a gas diffusion electrode substrate having a planar microporous part in the catalyst layer side of the electrode substrate, shown in Table 3, was obtained according to the methods described in <Formation of Precursor of Microporous Part (A)> and <Sintering>.

In Comparative Example 2, the anti-flooding and anti-dry-out characteristics were insufficient for the same reason as in Comparative Example 1. Also in Comparative Example 3, the reason for insufficient anti-flooding characteristic was that the pore volume $V_{(10-100)}$ became large like 8 times or more of the pore volume $V_{(0.01-10)}$, thus water removal path was closed. Moreover in Comparative Example 4, the microporous part (A) was thick, and the thermal conductivity was insufficient, thus dry-out of the electrolyte membrane could not be suppressed.

TABLE 1

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| Electrode substrate | Thickness [μm] |  | 100 | 100 | 100 | 100 | 100 | 100 | 100 | 100 | 100 |
|  | Surface roughness [μm] | Surface on microporous part (A) side | 16.1 | 16.1 | 16.1 | 16.1 | 16.1 | 16.1 | 16.8 | 16.1 | 16.1 |
|  |  | Opposite surface on microporous part (A) side | 16.8 | 16.8 | 16.8 | 16.8 | 16.8 | 16.8 | 17.5 | 16.8 | 16.8 |
|  |  | Difference of roughness between both sides | 0.7 | 0.7 | 0.7 | 0.7 | 0.7 | 0.7 | 0.8 | 0.7 | 0.7 |
| Microporous part (A) | Areal weight [g/m²] |  | 15 | 15 | 15 | 15 | 15 | 15 | 15 | 15 | 15 |
|  | Thickness [μm] |  | 25 | 25 | 26 | 25 | 25 | 26 | 26 | 26 | 25 |
| Microporous part (B) | Composition of carbon coating solution | "DENKA BLACK" (registered trademark) (acetylene black) (aspect ratio: 1) | 7.7 | 7.7 | 7.7 | 7.7 | 7.7 | 6.6 | 6.1 | 5.5 | 4.4 |
|  |  | "VGCF-H" (registered trademark) (vapor phase growth carbon fiber) (aspect ratio: 50) | — | — | — | — | — | 1.1 | 1.6 | 2.2 | 3.3 |
|  |  | Multi-walled carbon nanotube (aspect ratio: 1300) | — | — | — | — | — | — | — | — | — |
|  |  | "SSX-102" (registered trademark) (PMMA beads) | — | — | — | — | — | — | — | — | — |
|  |  | "TFL-300" (registered trademark) (titanium oxide) | — | — | — | — | — | — | — | — | — |
|  |  | "POLYFLON" (registered trademark) D-1E (PTFE resin) | 2.5 | 2.5 | 2.5 | 2.5 | 2.5 | 2.5 | 2.5 | 2.5 | 2.5 |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
|  | "NEOFLON" (registered trademark) ND-110 (FEP resin) | — | — | — | — | — | — | — | — | — |
|  | "TRITON" (registered trademark) X-100 (surfactant) | 2.5 | 2.5 | 2.5 | 2.5 | 2.5 | 2.5 | 2.5 | 2.5 | 2.5 |
|  | Purified water | 100 | 100 | 100 | 100 | 100 | 100 | 100 | 100 | 100 |
|  | Pore filling rate of electrode substrate [%] | 15 | 25 | 43 | 62 | 62 | 45 | 47 | 49 | 50 |
|  | Porosity of microporous part (B) [%] | 61 | 62 | 63 | 62 | 62 | 67 | 69 | 72 | 78 |
|  | Areal weight [g/m$^2$] | 5.7 | 7.5 | 10.1 | 12.5 | 12.8 | 9.9 | 10 | 10.1 | 83 |
|  | Melting point of water repellent agent (DSC method) [°C.] | 328 | 330 | 330 | 329 | 330 | 329 | 331 | 330 | 329 |
|  | Ratio of water repellent agent to carbon based filler [% by mass] | 19 | 19 | 19 | 19 | 19 | 19 | 19 | 19 | 19 |
| Pore size and pore volume distribution of gas diffusion electrode substrate | In gas diffusion electrode substrate $V_{(0.1-10)}/V_{(10-100)}$ | 0.95 | 1.03 | 1.32 | 2.54 | 4.56 | 1.30 | 1.31 | 1.31 | 1.32 |
|  | In gas diffusion electrode substrate $V_{(0.03-0.3)}/V_{(0.3-3)}$ | 1.09 | 1.10 | 1.11 | 1.10 | 1.12 | 0.91 | 0.81 | 0.64 | 0.59 |
|  | In electrode substrate part $V_{(0.03-0.3)}/V_{(0.3-3)}$ | 1.28 | 1.28 | 1.30 | 1.29 | 1.31 | 0.93 | 0.82 | 0.65 | 0.61 |
| Anti-flooding characteristic | Current density [A/cm$^2$] (Operation temperature of 40°C., humidification temperature of 40°C., and output voltage of 0.2 V) | 1.67 | 1.70 | 1.74 | 1.69 | 1.68 | 1.76 | 1.79 | 1.80 | 1.82 |
| Anti-dry-out characteristic | Current density [A/cm$^2$] (Operation temperature of 80°C., humidification temperature of 80°C., and output voltage of 0.2 V) | 1.65 | 1.65 | 1.66 | 1.68 | 1.69 | 1.67 | 1.68 | 1.68 | 1.70 |

TABLE 2

|  |  |  | Example 10 | Example 11 | Example 12 | Example 13 | Example 14 | Example 15 | Example 16 |
|---|---|---|---|---|---|---|---|---|---|
| Electrode substrate | Thickness [μm] |  | 100 | 100 | 100 | 100 | 100 | 100 | 100 |
|  | Surface roughness [μm] | Surface on microporous part (A) side | 16.1 | 16.1 | 14.2 | 14.2 | 15.1 | 15.8 | 16.1 |
|  |  | Opposite surface on microporous part (A) side | 16.8 | 16.8 | 20.4 | 20.4 | 19.2 | 17.3 | 16.8 |
|  |  | Difference of roughness between both sides | 0.7 | 0.7 | 6.2 | 6.2 | 4.1 | 1.5 | 0.7 |
| Microporous part (A) | Areal weight [g/m$^2$] |  | 15 | 15 | 15 | 15 | 15 | 15 | 15 |
|  | Thickness [μm] |  | 25 | 25 | 25 | 26 | 25 | 25 | 25 |
| Microporous part (B) | Composition of carbon coating solution | "DENKA BLACK" (registered trademark) (acetylene black) (aspect ratio: 1) | 5.5 | 5.5 | 5.5 | 7.7 | 7.7 | 7.7 | 7.7 |
|  |  | "VGCF-H" (registered trademark) (vapor phase growth carbon fiber) (aspect ratio: 50) | — | — | — | — | — | — | — |
|  |  | Multi-walled carbon nanotube (aspect ratio: 1300) | 2.2 | — | — | — | — | — | — |
|  |  | "SSX-102" (registered trademark) (PMMA beads) | — | 2.2 | — | — | — | — | — |
|  |  | "TFL-300" (registered trademark) (titanium oxide) | — | — | 2.2 | — | — | — | — |
|  |  | "POLYFLON" (registered trademark) D-1E (PTFE resin) | 2.5 | 2.5 | 2.5 | 2.5 | 2.5 | 2.5 | — |
|  |  | "NEOFLON" (registered trademark) ND-110 (FEP resin) | — | — | — | — | — | — | 2.5 |
|  |  | "TRITON" (registered trademark) X-100 (surfactant) | 2.5 | 2.5 | 2.5 | 25 | 25 | 25 | 2.5 |

TABLE 2-continued

|  |  | | | | | | | |
|---|---|---|---|---|---|---|---|---|
| | | Purified water | 100 | 100 | 100 | 100 | 100 | 100 | 100 |
| | | Pore filling rate of electrode substrate [%] | 49 | 49 | 51 | — | — | — | — |
| | | Porosity of microporous part (B) [%] | 67 | 71 | 72 | 63 | 62 | 62 | 61 |
| | | Areal weight [g/m$^2$] | 10 | 10 | 10 | 10 | 10 | 10 | 10 |
| | | Melting point of water repellent agent (DSC method) [° C.] | 329 | 329 | 330 | 328 | 327 | 329 | 309 |
| | | Ratio of water repellent agent to carbon based filler [% by mass] | 19 | 19 | 19 | 19 | 19 | 19 | 18 |
| Pore size and pore volume distribution of gas diffusion electrode substrate | | In gas diffusion electrode substrate $V_{(0.1-10)}/V_{(10-100)}$ | 1.12 | 1.12 | 1.34 | 1.31 | 1.30 | 1.32 | 1.32 |
| | | In gas diffusion electrode substrate $V_{(0.03-0.3)}/V_{(0.3-3)}$ | 1.02 | 0.65 | 0.63 | 1.12 | 1.12 | 1.13 | 1.12 |
| | | In electrode substrate part $V_{(0.03-0.3)}/V_{(0.3-3)}$ | 1.10 | 0.63 | 0.62 | 1.30 | 1.31 | 1.32 | 1.31 |
| Anti-flooding characteristic | | Current density [A/cm$^2$] (Operation temperature of 40° C., humidification temperature of 40° C., and output voltage of 0.2 V) | 1.71 | 1.75 | 1.74 | 1.71 | 1.79 | 1.75 | 1.76 |
| Anti-dry-out characteristic | | Current density [A/cm$^2$] (Operation temperature of 80° C., humidification temperature of 80° C., and output voltage of 0.2 V) | 1.66 | 1.66 | 1.69 | 1.64 | 1.68 | 1.67 | 1.67 |

| | | | Example 17 | Example 18 | Example 19 | Example 20 | Example 21 | Example 22 |
|---|---|---|---|---|---|---|---|---|
| Electrode substrate | Thickness [μm] | | 100 | 100 | 100 | 150 | 200 | 100 |
| | Surface roughness [μm] | Surface on microporous part (A) side | 16.1 | 16.1 | 16.1 | 16.2 | 16.4 | 16.1 |
| | | Opposite surface on microporous part (A) side | 16.8 | 16.8 | 16.8 | 16.9 | 17.2 | 16.8 |
| | | Difference of roughness between both sides | 0.7 | 0.7 | 0.7 | 0.7 | 0.8 | 0.7 |
| Microporous part (A) | Areal weight [g/m$^2$] | | 15 | 15 | 15 | 15 | 15 | 30 |
| | Thickness [μm] | | 26 | 25 | 25 | 26 | 30 | 60 |
| Microporous part (B) | Composition of carbon coating solution | "DENKA BLACK" (registered trademark) (acetylene black) (aspect ratio: 1) | 7.7 | 7.7 | 2.2 | 3.4 | 3.4 | 7.7 |
| | | "VGCF-H" (registered trademark) (vapor phase growth carbon fiber) (aspect ratio: 50) | — | — | 5.5 | 3.3 | 3.3 | — |
| | | Multi-walled carbon nanotube (aspect ratio: 1300) | — | — | — | — | — | — |
| | | "SSX-102" (registered trademark) (PMMA beads) | — | — | — | — | — | — |
| | | "TFL-300" (registered trademark) (titanium oxide) | — | — | — | — | — | — |
| | | "POLYFLON" (registered trademark) D-1E (PTFE resin) | — | — | — | 2.5 | 2.5 | 2.5 |
| | | "NEOFLON" (registered trademark) ND-110 (FEP resin) | 5.5 | 8.5 | 2.5 | — | — | — |
| | | "TRITON" (registered trademark) X-100 (surfactant) | 2.5 | 2.5 | 2.5 | 2.5 | 2.5 | 2.5 |
| | | Purified water | 100 | 100 | 100 | 100 | 100 | 100 |
| | | Pore filling rate of electrode substrate [%] | — | — | — | 53 | 54 | 55 |
| | | Porosity of microporous part (B) [%] | 63 | 63 | 83 | 75 | 76 | 75 |
| | | Areal weight [g/m$^2$] | 10 | 10 | 10 | 15 | 20 | 10 |
| | | Melting point of water repellent agent (DSC method) [° C.] | 309 | 308 | 308 | 329 | 330 | 330 |
| | | Ratio of water repellent agent to carbon based filler [% by mass] | 40 | 61 | 18 | 19 | 19 | 19 |
| Pore size and pore volume distribution of gas | | In gas diffusion electrode substrate $V_{(0.1-10)}/V_{(10-100)}$ | 1.31 | 1.32 | 1.29 | 1.29 | 1.08 | 1.56 |
| | | In gas diffusion electrode substrate $V_{(0.03-0.3)}/V_{(0.3-3)}$ | 1.11 | 1.11 | 0.38 | 0.58 | 0.59 | 0.59 |

TABLE 2-continued

| | | | | | | | |
|---|---|---|---|---|---|---|---|
| diffusion electrode substrate | In electrode substrate part $V_{(0.03-0.3)}/V_{(0.3-3)}$ | 1.30 | 1.31 | 0.32 | 0.48 | 0.49 | 0.48 |
| Anti-flooding characteristic | Current density [A/cm$^2$] (Operation temperature of 40° C., humidification temperature of 40° C., and output voltage of 0.2 V) | 1.75 | 1.71 | 1.82 | 1.73 | 1.66 | 1.67 |
| Anti-dry-out characteristic | Current density [A/cm$^2$] (Operation temperature of 80° C., humidification temperature of 80° C., and output voltage of 0.2 V) | 1.67 | 1.62 | 1.70 | 1.68 | 1.65 | 1.68 |

TABLE 3

| | | | Comparative Example 1 | Comparative Example 2 | Comparative Example 3 | Comparative Example 4 |
|---|---|---|---|---|---|---|
| Electrode substrate | Thickness [μm] | | 100 | 100 | 100 | 100 |
| | Surface roughness [μm] | Surface on microporous part (A) side | 16.1 | 16.1 | 16.1 | 16.1 |
| | | Opposite surface on microporous part (A) side | 16.8 | 16.8 | 16.8 | 16.8 |
| | | Difference of roughness between both sides | 0.7 | 0.7 | 0.7 | 0.7 |
| Microporous part (A) | Areal weight [g/m$^2$] | | 15 | 15 | 15 | 35 |
| | Thickness [μm] | | 25 | 26 | 26 | 72 |
| Microporous part (B) | Composition of carbon coating solution | "DENKA BLACK" (registered trademark) (acetylene black) (aspect ratio: 1) | — | 7.7 | 7.7 | 7.7 |
| | | "VGCF-H" (registered trademark) (vapor phase growth carbon fiber) (aspect ratio: 50) | — | — | — | — |
| | | Multi-walled carbon nanotube (aspect ratio: 1300) | — | — | — | — |
| | | "SSX-102" (registered trademark) (PMMA beads) | — | — | — | — |
| | | "TFL-300" (registered trademark) (titanium oxide) | — | — | — | — |
| | | "POLYFLON" (registered trademark) D-1E (PTFE resin) | — | 2.5 | 2.5 | 3.5 |
| | | "NEOFLON" (registered trademark) ND-110 (FEP resin) | — | — | — | — |
| | | "TRITON" (registered trademark) X-100 (surfactant) | — | 2.5 | 2.5 | 2.5 |
| | | Purified water | — | 100 | 100 | 100 |
| | Pore filling rate of electrode substrate [%] | | 0 | 15 | 74 | 55 |
| | Porosity of microporous part (B) [%] | | — | 62 | 61 | 75 |
| | Areal weight [g/m$^2$] | | 0 | 5 | 15 | 15 |
| | Melting point of water repellent agent (DSC method) [° C.] | | 329 | 331 | 328 | 328 |
| | Ratio of water repellent agent to carbon based filler [% by mass] | | — | 19 | 19 | 19 |
| Pore size and pore volume distribution of gas diffusion electrode substrate | In gas diffusion electrode substrate $V_{(0.1-10)}/V_{(10-100)}$ | | 0.72 | 0.88 | 8.30 | 1.62 |
| | In gas diffusion electrode substrate $V_{(0.03-0.3)}/V_{(0.3-3)}$ | | 1.29 | 1.30 | 1.27 | 0.56 |
| | In electrode substrate part $V_{(0.03-0.3)}/V_{(0.3-3)}$ | | 1.47 | 1.49 | 1.46 | 0.45 |
| Anti-flooding characteristic | Current density [A/cm$^2$] (Operation temperature of 40° C., humidification temperature of 40° C., and output voltage of 0.2 V) | | 1.57 | 1.60 | 1.45 | 1.62 |

TABLE 3-continued

|  |  | Comparative Example 1 | Comparative Example 2 | Comparative Example 3 | Comparative Example 4 |
|---|---|---|---|---|---|
| Anti-dry-out characteristic | Current density [A/cm$^2$] (Operation temperature of 80° C., humidification temperature of 80° C., and output voltage of 0.2 V) | 1.62 | 1.62 | 1.51 | 1.63 |

In Tables 1 to 3, the addition amounts are described in part(s) by mass.

The invention claimed is:

1. A gas diffusion electrode substrate comprising:
an electrode substrate;
a first microporous portion comprising a carbon based filler and a water repellent agent which is formed on one surface of the electrode substrate with a thickness in the range of 10 μm or more and 60 μm or less; and
a second microporous portion comprising a carbon based filler and a water repellent agent which is impregnated in a part of the interior of the electrode substrate, wherein
the electrode substrate has pores with a size of 10 μm or more and less than 100 μm as volume of pores which corresponds to V(10-100): volume of pores with a size of 10 μm or more and less than 100 μm as measured by mercury porosimetry of the gas diffusion electrode substrate,
the first and second microporous portions have pores with a size of 0.1 μm or more and less than 10 μm as volume of pores which corresponds to V(0.1-10): volume of pores with a size of 0.1 μm or more and less than 10 μm measured by mercury porosimetry of the gas diffusion electrode substrate, and
V(0.1-10) is set in the range of 0.9 times or more and 5 times or less of V(10-100).

2. The gas diffusion electrode substrate according to claim 1, wherein the thickness of the electrode substrate is in the range of 50 μm or more and 190 μm or less.

3. The gas diffusion electrode substrate according to claim 1, wherein the volume of pores with a pore size of 0.03 μm or more and less than 0.3 μm is smaller than the volume of pores with a pore size of 0.3 μm or more and less than 3 μm.

4. The gas diffusion electrode substrate according to claim 1, wherein V(0.1-10) is set in the range of one time or more and 5 times or less of V(10-100).

5. The gas diffusion electrode substrate according to claim 1, wherein within the second microporous portion, the volume of pores with a pore size of 0.03 μm or more and less than 0.3 μm is smaller than the volume of pores with a pore size of 0.3 μm or more and less than 3 μm.

6. The gas diffusion electrode substrate according to claim 1, wherein 20% or more and 70% or less of the pores of the electrode substrate interior are impregnated to form the second microporous portion.

7. The gas diffusion electrode substrate according to claim 1, wherein the second microporous portion has a porosity in the range of 50% or more and 90% or less.

8. The gas diffusion electrode substrate according to claim 1, wherein the porosity of the second microporous portion is larger than the porosity of the first microporous portion by 5% or more.

9. The gas diffusion electrode substrate according to claim 1, wherein the carbon based filler of the second microporous portion has an aspect ratio of 30 or more and 5000 or less.

10. The gas diffusion electrode substrate according to claim 9, wherein the carbon based filler of the second microporous portions is a fibrous carbon having a diameter of 1 nm or more and 500 nm or less.

11. The gas diffusion electrode substrate according to claim 1, wherein the water repellent agent of the second microporous has a melting point of 200° C. or more and 320° C. or less.

12. The gas diffusion electrode substrate according to claim 1, wherein the mass ratio of the water repellent agent to the carbon based filler of the second microporous portion is 5% by mass or more and 50% by mass or less, based on the carbon based filler.

13. The gas diffusion electrode substrate according to claim 1, wherein the electrode substrate surface roughness on a first side including the first microporous portion is smaller than the electrode substrate surface roughness on a second opposite side by a difference of 1 μm or more and 5 μm or less.

14. A membrane electrode assembly having catalyst layers on both sides of the electrolyte membrane, and further having the gas diffusion electrode substrate as defined in claim 1 on the outer side of the catalyst layers.

15. A fuel cell having bipolar plates on both sides of the membrane electrode assembly as defined in claim 14.

16. The gas diffusion electrode substrate according to claim 1, wherein the electrode substrate comprises an electrically conductive porous material selected from the group comprising carbon fiber woven fabric, carbon fiber nonwoven fabric, or carbon fiber papermaking substrate; or a metal porous material selected from the group comprising sintered foam metal, metal mesh or expanded metal.

* * * * *